(12) United States Patent
Oba

(10) Patent No.: US 12,510,636 B2
(45) Date of Patent: Dec. 30, 2025

(54) LIGHT RECEIVING APPARATUS, RANGING APPARATUS, AND LIGHT EMISSION CONTROL METHOD

(71) Applicant: SONY SEMICONDUCTOR SOLUTIONS CORPORATION, Kanagawa (JP)

(72) Inventor: Toshihiro Oba, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 1135 days.

(21) Appl. No.: 17/437,543

(22) PCT Filed: Mar. 12, 2020

(86) PCT No.: PCT/JP2020/010834
§ 371 (c)(1),
(2) Date: Sep. 9, 2021

(87) PCT Pub. No.: WO2020/195898
PCT Pub. Date: Oct. 1, 2020

(65) Prior Publication Data
US 2022/0146646 A1    May 12, 2022

(30) Foreign Application Priority Data
Mar. 22, 2019   (JP) .................... 2019-054684

(51) Int. Cl.
*G01S 7/4865* (2020.01)
*G01S 7/497* (2006.01)
*G01S 17/10* (2020.01)
(52) U.S. Cl.
CPC ............ *G01S 7/4865* (2013.01); *G01S 7/497* (2013.01); *G01S 17/10* (2013.01)

(58) Field of Classification Search
CPC ........ G01S 7/4865; G01S 7/497; G01S 17/10; G01S 7/484; G01S 17/14; G01S 7/4815; G01S 17/894
See application file for complete search history.

(56) References Cited

U.S. PATENT DOCUMENTS

| 2015/0041625 A1 | 2/2015 | Dutton |
| 2016/0033644 A1 | 2/2016 | Moore |

(Continued)

FOREIGN PATENT DOCUMENTS

| EP | 3373031 A1 | 9/2018 |
| JP | 2000-346941 A | 12/2000 |

(Continued)

OTHER PUBLICATIONS

International Search Report and Written Opinion of PCT Application No. PCT/JP2020/010834, issued on Jun. 2, 2020, 10 pages of ISRWO.

*Primary Examiner* — Yuqing Xiao
*Assistant Examiner* — Jempson Noel
(74) *Attorney, Agent, or Firm* — CHIP LAW GROUP

(57) ABSTRACT

A light receiving apparatus according to an embodiment includes: a light receiving unit that includes a light receiving element, a light emission control unit that issues a trigger for causing a light source to emit light, a receiving unit that receives, from a light source unit that includes the light source, a feedback signal that is output in accordance with a light emission timing at which the light source emits the light, a delay acquiring unit that acquires delay time of a reception timing at which the feedback signal is received by the receiving unit is delayed relative to an issue timing at which the trigger is issued, and a representative value acquiring unit that acquires a representative value of a plurality of pieces of the delay time in accordance with the (Continued)

issue of the triggers issued by the light emission control unit a predetermined number of times.

21 Claims, 26 Drawing Sheets

(56)  References Cited

U.S. PATENT DOCUMENTS

| | | | |
|---|---|---|---|
| 2017/0199271 A1* | 7/2017 | Nihei | H05B 47/115 |
| 2018/0136330 A1* | 5/2018 | Nihei | G01S 7/4808 |
| 2018/0259627 A1 | 9/2018 | Shinozuka et al. | |
| 2018/0259629 A1* | 9/2018 | Oohata | G01S 17/10 |
| 2020/0191958 A1* | 6/2020 | Ikuta | G01S 7/4865 |

FOREIGN PATENT DOCUMENTS

| | | |
|---|---|---|
| JP | 4334678 B2 | 9/2009 |
| JP | 2016-211881 A | 12/2016 |
| JP | 2017-125829 A | 7/2017 |
| JP | 2018-151197 A | 9/2018 |
| WO | WO-2018211762 A1 | 11/2018 |

* cited by examiner

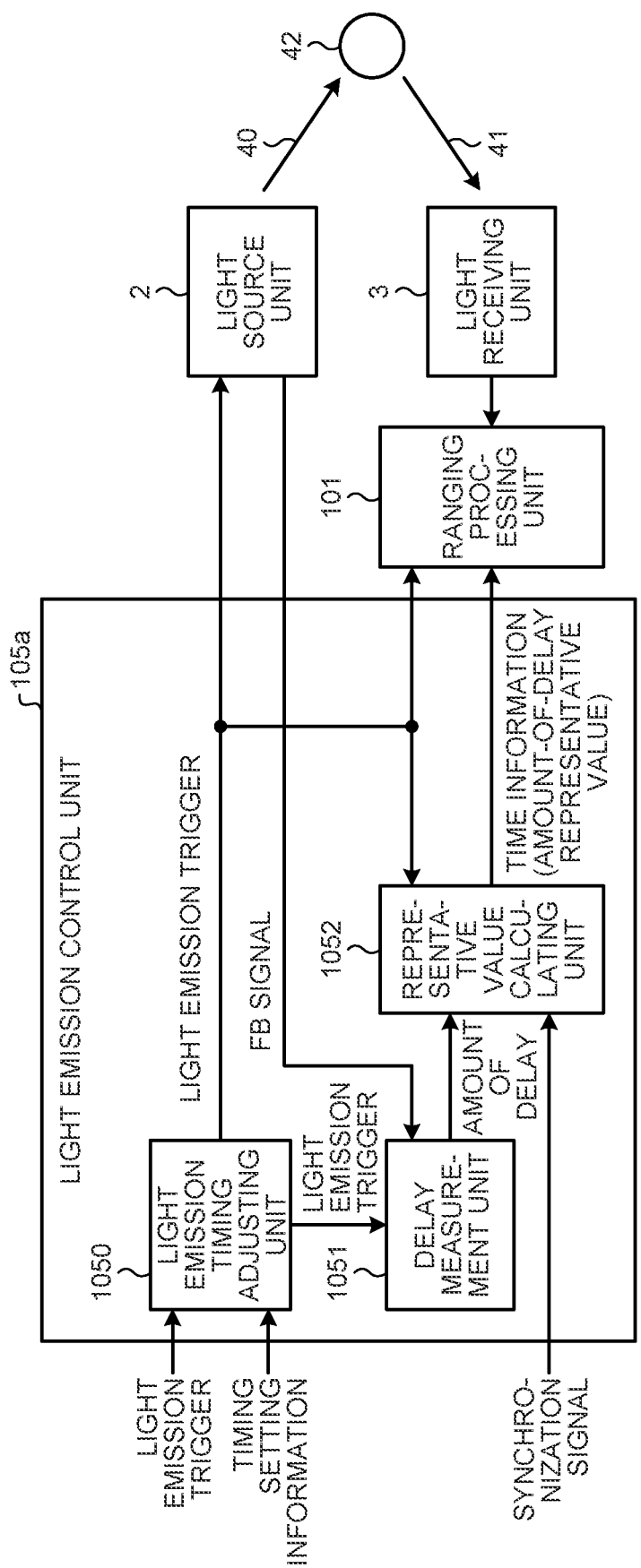

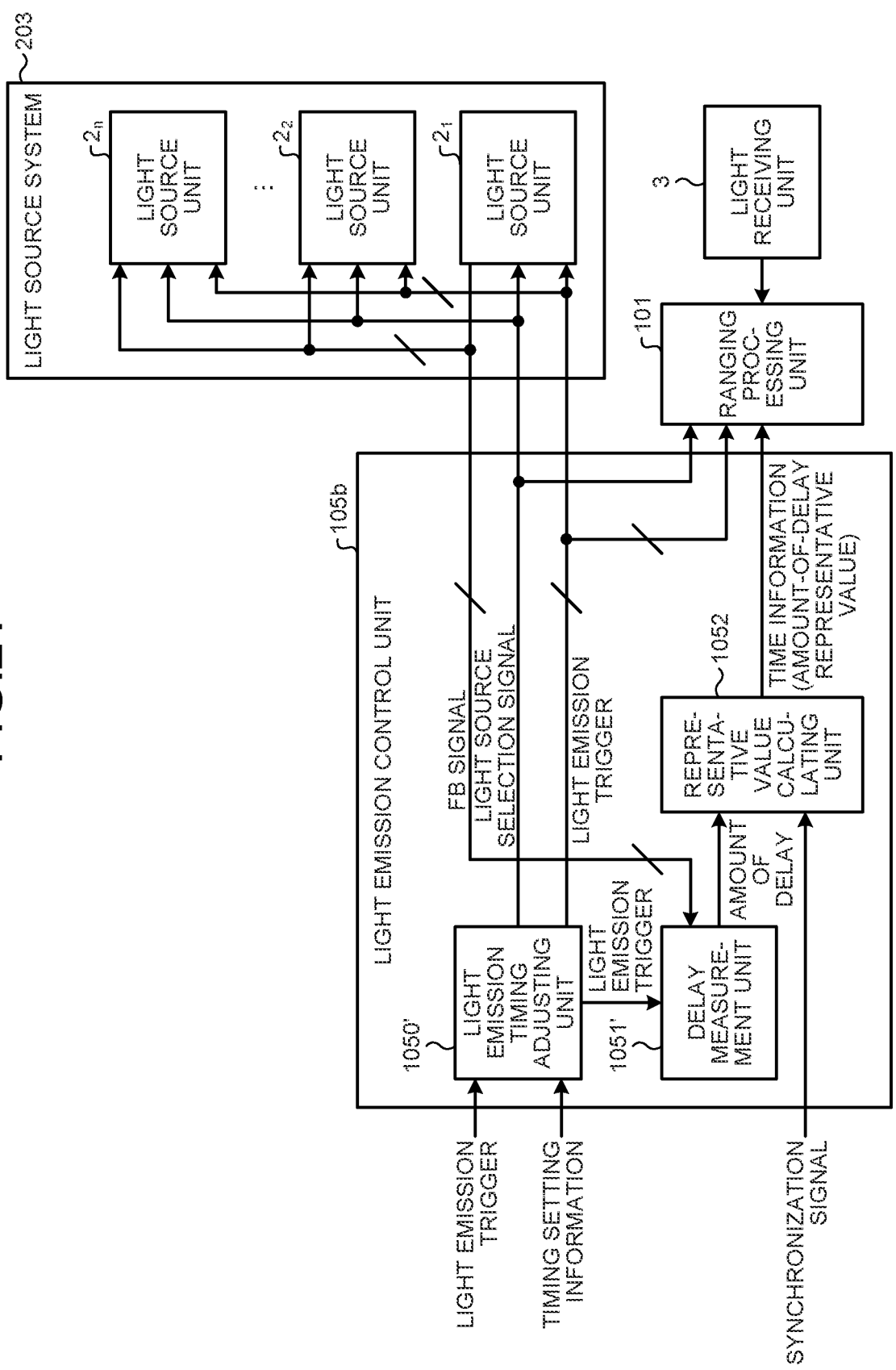

LIGHT RECEIVING APPARATUS, RANGING APPARATUS, AND LIGHT EMISSION CONTROL METHOD

CROSS REFERENCE TO RELATED APPLICATIONS

This application is a U.S. National Phase of International Patent Application No. PCT/JP2020/010834 filed on Mar. 12, 2020, which claims priority benefit of Japanese Patent Application No. JP 2019-054684 filed in the Japan Patent Office on Mar. 22, 2019. Each of the above-referenced applications is hereby incorporated herein by reference in its entirety.

FIELD

The present invention relates to a light receiving apparatus, a ranging apparatus, and a light emission control method.

BACKGROUND

There is a known ranging method called a direct time of flight (ToF) technique as one of ranging techniques for measuring a distance to an object to be measured by using light. In a ranging process using the direct ToF technique, a distance to an object to be measured is obtained on the basis of a measured time period between an emission timing that indicates emission of light emitted by a light source and a light receiving timing at which the emitted light is reflected by the object to be measured and is received as reflected light by a light receiving element.

In the direct ToF technique, it is possible to implement ranging with higher accuracy by subtracting an amount of delay in an internal process between a control unit and a light emitting device from the measurement result of the time period. For example, the light emitting device emits light in accordance with a light emission trigger that is output from the control unit and returns a feedback signal that indicates a timing, at which light is to be emitted, to the control unit. The control unit obtains the amount of delay in the internal process on the basis of a timing at which the control unit outputs the light emission trigger and a timing that is indicated by the feedback signal. The control unit performs ranging on the basis of the time period obtained by subtracting the amount of delay in the internal process from the time period between the light receiving timing and the timing at the light emission trigger is output.

CITATION LIST

Patent Literature

Patent Literature 1: Japanese Laid-open Patent Publication No. 2016-211881

SUMMARY

Technical Problem

However, an input timing at which the feedback signal is input to the control unit possibly varies caused by noise. The variations in the input timing of the feedback signal with respect to the control unit may possibly affect the accuracy of the ranging.

Accordingly, it is an object in one aspect of an embodiment of the present disclosure to provide a light receiving apparatus, a ranging apparatus, and a light emission control method capable of performing ranging with higher accuracy in the direct ToF technique.

Solution to Problem

For solving the problem described above, a light receiving apparatus according to one aspect of the present disclosure has a light receiving unit that includes a light receiving element; a light emission control unit that issues a trigger for causing a light source to emit light; a receiving unit that receives, from a light source unit that includes the light source, a feedback signal that is output in accordance with a light emission timing at which the light source emits the light; a delay acquiring unit that acquires delay time of a reception timing, at which the feedback signal is received by the receiving unit, that is delayed relative to an issue timing at which the trigger is issued; a representative value acquiring unit that acquires a representative value of a plurality of pieces of the delay time acquired by the delay acquiring unit in accordance with the issue of the triggers issued by the light emission control unit a predetermined number of times; and a signal processing unit that performs signal processing on the basis of the light emission timing and a light receiving timing of the light receiving element, wherein the signal processing unit corrects the light emission timing on the basis of the representative value.

BRIEF DESCRIPTION OF DRAWINGS

FIG. 9 is a block diagram illustrating a configuration of an example of a light emission control unit according to a first embodiment.

FIG. 21 is a block diagram illustrating a configuration of an example of a light emission control unit and a light source system according to a second embodiment.

DESCRIPTION OF EMBODIMENTS

Figure 1:
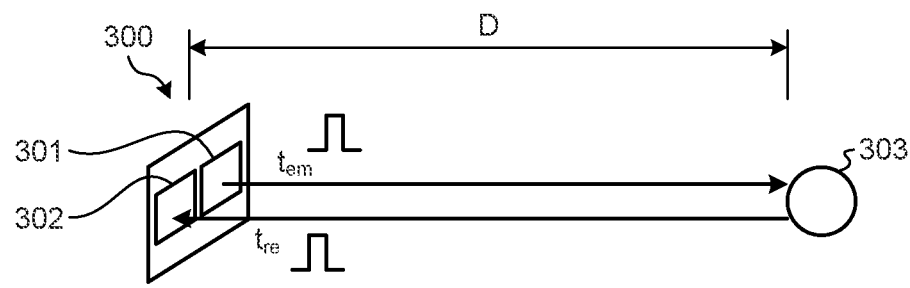
FIG. 1 is a diagram schematically illustrating ranging performed by using a direct ToF technique applicable to each of embodiments.

Preferred embodiments of the present disclosure will be described in detail below with reference to the accompanying drawings. Furthermore, in the embodiments, by assigning the same reference numerals to components having the same functional configuration, overlapping descriptions thereof will be omitted.

Configuration Common to Each Embodiment

The present disclosure is suitable for use in a technique for detecting a photon. Before a description of each of the embodiments according to the present disclosure, in order to facilitate understanding, a technique for performing ranging on the basis of detection of a photon will be described as one of techniques applicable to each of the embodiments. As a ranging technique in this case, a direct time of flight (ToF) technique will be used. The direct ToF technique is a technique for performing ranging on the basis of a time period of a difference between a light emission timing and a light receiving timing at which light that is emitted from a light source is reflected by an object to be measured and the obtained reflected light is received by a light receiving element.

An outline of ranging performed by using the direct ToF technique will be described with reference to FIG. 1 and FIG. 2. FIG. 1 is a diagram schematically illustrating ranging performed by the direct ToF technique that is applicable to each of the embodiments. A ranging apparatus 300 includes a light source unit 301 and a light receiving unit 302. The light source unit 301 is, for example, a laser diode and is driven so as to emit pulsed laser light. The light emitted from the light source unit 301 is reflected by an object to be measured 303 and is received as reflected light by the light receiving unit 302. The light receiving unit 302 includes a light receiving element, which performs photoelectric conversion on received light to convert the received light to an electrical signal, and outputs a signal in accordance with the received light.

Here, it is assumed that a clock time at which the light source unit 301 emits light (light emission timing) is denoted by time $t_{em}$ and a clock time at which the light emitted from the light source unit 301 is reflected by the object to be measured 303 and is received as reflected light by the light receiving unit 302 (light receiving timing) is denoted by time $t_{re}$. If a constant c is a speed of light ($2.9979 \times 10^8$ [m/sec]), a distance D between the ranging apparatus 300 and the object to be measured 303 is calculated by Equation (1) below.

$$D=(c/2) \times (t_{em}-t_{re}) \quad (1)$$

The ranging apparatus 300 repeatedly performs the process described above several times. The light receiving unit 302 may include a plurality of light receiving elements and calculate each of the distances D on the basis of the respective light receiving timings at which the pieces of reflected light are received by the respective light receiving elements. The ranging apparatus 300 classifies time $t_m$ (hereinafter, referred to as light receiving time $t_m$) between time $t_{em}$, which is the light emission timing, and the light receiving timing, at which the light is received by the light receiving unit 302, on the basis of categories (bins), and generates a histogram.

Furthermore, the light received by the light receiving unit 302 in a period of time indicated by the light receiving time $t_m$ is not limited to the reflected light of the light that is emitted by the light source unit 301 and that is reflected by the object to be measured. For example, ambient light that is present around the ranging apparatus 300 (the light receiving unit 302) is also received by the light receiving unit 302.

Figure 2:
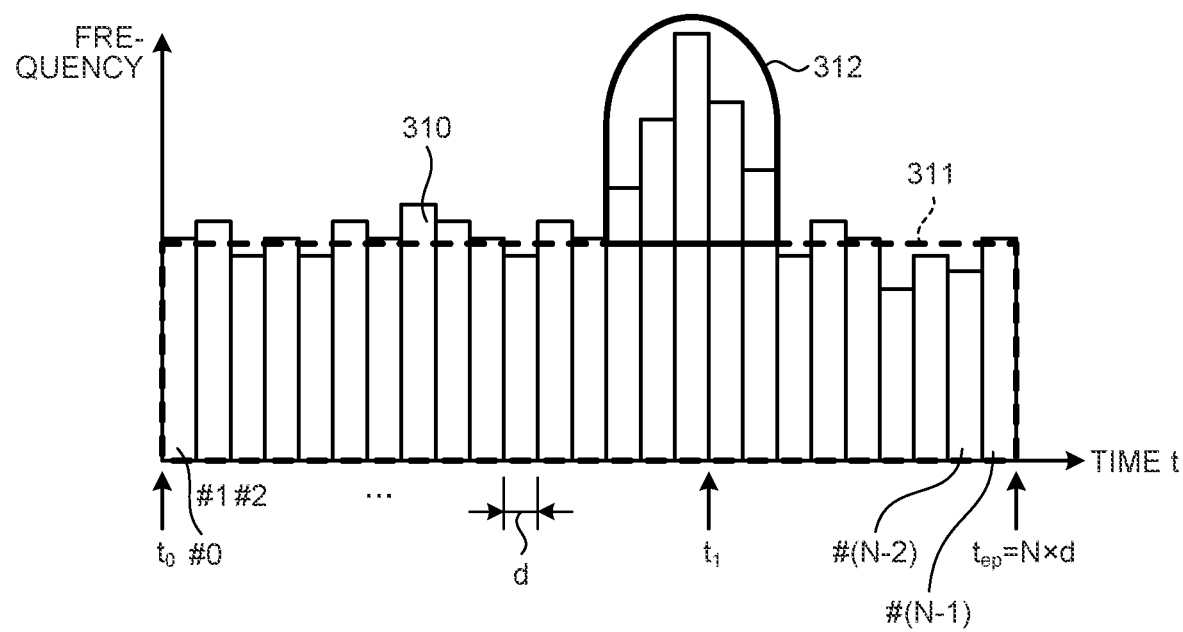
FIG. 2 is a diagram illustrating an example of a histogram based on a clock time at which a light receiving unit receives light, which is applicable to each of the embodiments.

FIG. 2 is a diagram illustrating an example of a histogram based on a clock time at which the light receiving unit 302 receives the light, which is applicable to each of the embodiments. In FIG. 2, the horizontal axis indicates bins and the vertical axis indicates the frequency for each bin. The bins are sorted by classifying the light receiving time $t_m$ into each predetermined unit time d. Specifically, a bin #0 is $0 \leq t_m < d$, a bin #1 is $d \leq t_m < 2 \times d$, a bin #2 is $2 \times d \leq t_m < 3 \times d$, . . . and, a bin

(N−2) is $(N-2) \times d \leq t_m < (N-1) \times d$. If exposure time of the light receiving unit 302 is denoted by time $t_{ep}$, $t_{ep} = N \times d$ holds.

The ranging apparatus 300 counts the number of acquisitions of the light receiving time $t_m$ on the basis of the bins, obtains a frequency 310 for each bin, and generates a histogram. Here, the light receiving unit 302 also receives light other than the reflected light of the light emitted from the light source unit 301. An example of the light other than the reflected light to be targeted includes an ambient light described above. The portion indicated by a region 311 in the histogram includes an ambient light component due to the ambient light. The ambient light is light that is randomly incident into the light receiving unit 302 and causes noise with respect to the target reflected light.

In contrast, the reflected light to be targeted is the light that is received in accordance with a specific distance and appears as an active light component 312 in the histogram. The bins associated with the peak of the frequency in the active light component 312 are the bins associated with the distance D of the object to be measured 303. The ranging apparatus 300 acquires representative time of the subject bins (for example, the time at the center of the bins) as the time $t_{re}$ described above, so that the ranging apparatus 300 is able to calculate the distance D to the object to be measured 303 in accordance with Equation (1) described above. In this way, by using a plurality of light receiving results, it is possible to perform appropriate ranging with respect to random noise.

Figure 3:
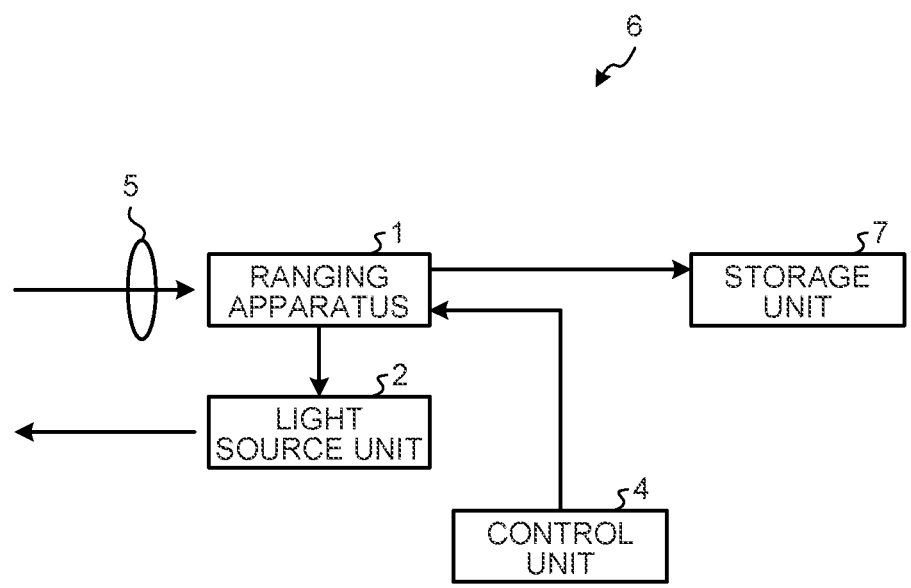
FIG. 3 is a block diagram illustrating a configuration of an example of an electronic device using a ranging apparatus according to each of the embodiments.

FIG. 3 is a block diagram illustrating a configuration of an example of an electronic device using the ranging apparatus according to each of the embodiments. In FIG. 3, an electronic device 6 includes a ranging apparatus 1, a light source unit 2, a storage unit 7, a control unit 4, and an optical system 5.

The light source unit 2 corresponds to the light source unit 301 described above, is a laser diode, and is driven so as to emit, for example, pulsed laser light. For the light source unit 2, a vertical-cavity surface-emitting laser (VCSEL) that emits laser light can be used as surface light source. However, the embodiment is not limited to this. The light source unit 2 may also be configured to use an array unit in which laser diodes are arranged in the form of a line and scan the laser light emitted from the laser diode array in a vertical direction relative to the line. Furthermore, the light source unit 2 may also be configured to use a laser diode as a single light source and scan the laser light emitted from the laser diode in a horizontal and vertical directions.

The ranging apparatus 1 includes a plurality of light receiving elements associated with the light receiving unit 302 described above. The plurality of light receiving elements forms a light receiving surface by being arranged, for example, in a two-dimensional grid manner. The optical system 5 guides the light that is incident from the outside onto the light receiving surface that is included in the ranging apparatus 1.

The control unit 4 performs overall control of the electronic device 6. For example, the control unit 4 supplies a light emission trigger that is a trigger to cause the light source unit 2 to emit light to the ranging apparatus 1. The ranging apparatus 1 allows the light source unit 2 to emit light at a timing based on the light emission trigger and stores the time $t_{em}$ that indicates the light emission timing. Furthermore, the control unit 4 sets, for example, in accordance with an instruction from the outside, a pattern that is used at the time of ranging to the ranging apparatus 1.

The ranging apparatus 1 counts the number of acquisitions of time information (light receiving time $t_m$), which indicates the timing at which the light is received on the light receiving surface, within a predetermined time range, and then, generates a histogram by obtaining the frequency for each bin. The ranging apparatus 1 further calculates the distance D to the object to be measured on the basis of the generated histogram. Information that indicates the calculated distance D is stored in the storage unit 7.

Figure 4:
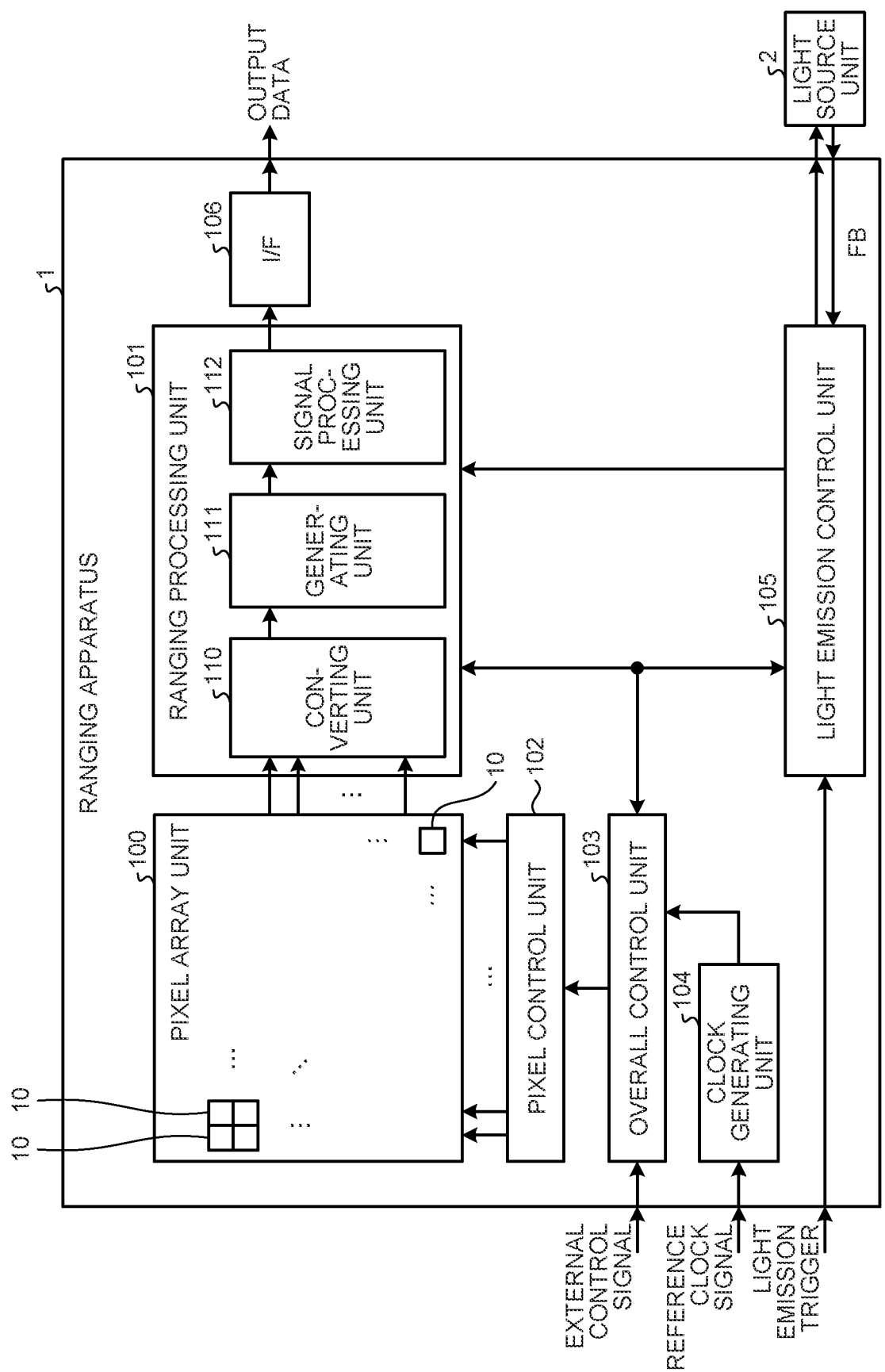
FIG. 4 is a block diagram illustrating, in more detail, a configuration of an example of a ranging apparatus applicable to each of the embodiments.

FIG. 4 is a block diagram illustrating, in more detail, a configuration of an example of the ranging apparatus 1 applicable to each of the embodiments. In FIG. 4, the ranging apparatus 1 includes a pixel array unit 100, a ranging processing unit 101, a pixel control unit 102, an overall control unit 103, a clock generating unit 104, a light emission control unit 105, and an interface (I/F) 106. The pixel array unit 100, the ranging processing unit 101, the pixel control unit 102, the overall control unit 103, the clock generating unit 104, the light emission control unit 105, and the interface (I/F) 106 can be arranged on a single semiconductor chip.

However, the configuration is not limited to this. The ranging apparatus 1 may also have a configuration in which a first semiconductor chip and a second semiconductor chip are laminated. In this case, for example, it is conceivable to use a configuration in which some of the part of the pixel array unit 100 (the light receiving unit, or the like) is arranged on the first semiconductor chip and the other parts of the ranging apparatus 1 are arranged on the second semiconductor chip.

In FIG. 4, the overall control unit 103 performs overall control of the ranging apparatus 1 in accordance with, for example, a program that is installed in advance. Furthermore, the overall control unit 103 may also perform control in accordance with an external control signal that is supplied from the outside. The clock generating unit 104 generates, on the basis of a reference clock signal supplied from the outside, one or more clock signals that are used in the ranging apparatus 1. The light emission control unit 105 adjusts the timing of the light emission trigger signal that is supplied from the outside, and then, issues a light emission trigger to cause the light source unit 2 to emit light at a predetermined timing. The light emission trigger is supplied to the light source unit 2 and is also supplied to the ranging processing unit 101.

The pixel array unit 100 includes a plurality of pixels 10, 10, and . . . , and each of which includes a light receiving element that is arrayed in a matrix manner. Operations of each of the pixels 10 are controlled by the pixel control unit 102 in accordance with an instruction from the overall control unit 103. For example, the pixel control unit 102 is able to control reading of a pixel signal from each of the pixels 10 for each block that includes (p×q) pieces of pixels 10 having p pixels in a row direction and q pixels in a column direction. Furthermore, the pixel control unit 102 scans each of the pixels 10 in the row direction in units of blocks, and furthermore, scans each of the pixels 10 in the column direction, so that the pixel control unit 102 is able to read the pixel signal from each of the pixels 10. The embodiment is not limited to this and the pixel control unit 102 is able to individually control each of the pixels 10. Furthermore, the pixel control unit 102 is able to use, by defining a predetermined area of the pixel array unit 100 as a target area, the pixels 10 included in the target area as the pixels 10 that are targeted for reading the pixel signals. Furthermore, the pixel control unit 102 is able to read the pixel signal from each of the pixels 10 by collectively scanning a plurality of rows (plurality of lines) and by further scanning the scanned portion in the column direction.

Furthermore, in the following, it is assumed that scanning indicates a process of allowing the light source unit 2 to emit light and reading the pixel signal that is associated with the light received from the pixel 10, which is continuously performed on each of the pixels 10 designated as a scanning target in a single scanning area. It is possible to perform the process of emitting light and reading the pixel signal several times in a single scanning process.

The pixel signal that has been read from each of the pixels 10 is supplied to the ranging processing unit 101. The ranging processing unit 101 includes a converting unit 110, a generating unit 111, and a signal processing unit 112.

The pixel signals that are read from the respective pixels 10 and are output from the pixel array unit 100 are supplied to the converting unit 110. Here, the pixel signals are asynchronously read from the respective pixels 10 and are supplied to the converting unit 110. Namely, the pixel signals are read from the light receiving elements in accordance with the timing at which the light is received by the associated pixels 10 and are then output.

The converting unit 110 converts the pixel signals supplied from the pixel array unit 100 to the digital information. Namely, the pixel signals supplied from the pixel array unit 100 are output in accordance with the timing at which the light is received by the light receiving elements included in the pixels 10 that are associated with the respective pixel signals that are supplied from the pixel array unit 100. The converting unit 110 converts the supplied pixel signals to the time information that indicates the timing.

The generating unit 111 generates a histogram on the basis of the time information that indicates the time at which the pixel signal is converted by the converting unit 110. Here, the generating unit 111 counts the pieces of time information on the basis of the unit time d that is set by a setting unit 113 and generates a histogram. Furthermore, the generating unit 111 is able to generate the histogram on the basis of the time information that is corrected on the basis of delay information (will be described later) that is supplied from the light emission control unit 105.

The signal processing unit 112 performs predetermined arithmetic processing on the basis of the data on the histogram generated by the generating unit 111 and obtains, for example, distance information. The signal processing unit 112 generates curve approximation on the subject histogram on the basis of, for example, the data on the histogram generated by the generating unit 111. The signal processing unit 112 is able to detect the peak of the curved line obtained by approximating this histogram and obtain the distance D on the basis of the detected peak.

At the time of performing the curve approximation of the histogram, the signal processing unit 112 is able to perform a filtering process on the curved line that is obtained by approximating the histogram. For example, the signal processing unit 112 is able to reduce a noise component by performing a low-pass filtering process on the curved line that is obtained by approximating the histogram.

The distance information obtained by the signal processing unit 112 is supplied to the interface 106. The interface 106 outputs the distance information supplied from the signal processing unit 112 to the outside as output data. For example, a mobile industry processor interface (MIPI) may be used for the interface 106.

Furthermore, in the above description, the distance information obtained by the signal processing unit 112 is output to the outside via the interface 106; however, the embodiment is not limited to this example. Namely, histogram data that is the data on the histogram generated by the generating unit 111 may also be configured to output to the outside from the interface 106. In this case, the ranging condition information that is set by the setting unit 113 may omit information that indicates a filter coefficient. The histogram data that is output from the interface 106 is supplied to, for example, an externally provided information processing apparatus and is then appropriately processed.

Furthermore, if the ranging apparatus 1 is configured without using, for example, the signal processing unit 112, it is conceivable that the ranging apparatus 1 functions as a light receiving apparatus that output information for performing ranging on the basis of the received light.

Furthermore, in the above description, it has been explained that the light emission control unit 105 is installed inside of the ranging apparatus 1; however, the example is not limited to this. Namely, the light emission control unit 105 may also be arranged outside of the ranging apparatus 1 as a configuration on the light source unit 2 side.

Figure 5:
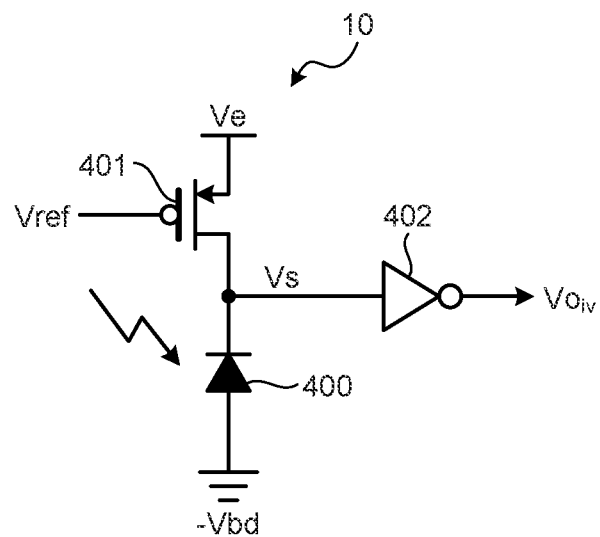
FIG. 5 is a diagram illustrating a basic configuration example of pixels applicable to each of the embodiments.

FIG. 5 is a diagram illustrating a basic configuration example of the pixel 10 applicable to each of the embodiment. In FIG. 5, the pixel 10 includes a light receiving element 400, a transistor 401 that is a P-channel MOS transistor, and an inverter 402.

The light receiving element 400 converts the incident light to an electrical signal by performing photoelectric conversion, and then, outputs the electrical signal. In each of the embodiments, the light receiving element 400 converts the incident photons to the electrical signal by performing photoelectric conversion, and then, outputs a pulse that is in accordance with the incident photons. In each of the embodiments, as the light receiving element 400, a single-photon avalanche diode is used. Hereinafter, the single-photon avalanche diode is referred to as a single-photon avalanche diode (SPAD). The SPAD exhibits a characteristic in which, if a large negative voltage that generates avalanche multiplication is applied to a cathode, electrons that are generated in accordance with a single incident photon generates avalanche multiplication and thus a large electric current flows. By using the characteristic of the SPAD, it is possible to detect a single incident photon with a high degree of sensitivity.

In FIG. 5, the light receiving element 400 that is the SPAD has a configuration in which a cathode is connected to a drain of the transistor 401 and an anode is connected to a voltage source of a negative voltage (−Vbd) associated with a breakdown voltage of the light receiving element 400. The source of the transistor 401 is connected to a voltage Ve. A reference voltage Vref is input to the gate of the transistor 401. The transistor 401 is an electric current source that outputs, from the drain, the electric current in accordance with the voltage Ve and the reference voltage Vref. With this configuration, a reverse bias is applied to the light receiving element 400. Furthermore, a photo-electric current flows in the direction from the cathode toward the anode of the light receiving element 400.

More specifically, if a photon is incident on the light receiving element 400 that is in a charged state due to a voltage (−Vbd) after a voltage (−Vbd) is applied to an anode, avalanche multiplication is started, so that an electric current flows in the direction from the cathode toward the anode and a voltage drop is accordingly generated in the light receiving element 400. If a voltage between the anode and the cathode of the light receiving element 400 drops to the voltage (−Vbd) due to this voltage drop, avalanche multiplication is stopped (quenching operation). After that, the light receiving element 400 is charged by the electric current (recharge electric current) that is output from the transistor 401 that is the electric current source, and then, the state of the light receiving element 400 returns to the state in which the photon is not yet incident (recharge operation).

Here, the quenching operation and the recharge operation are passive operations that are performed without being controlled from the outside.

A voltage Vs acquired from the connection point between the drain of the transistor 401 and the cathode of the light receiving element 400 is input to the inverter 402. The inverter 402 performs, for example, threshold judgement on the input voltage Vs, and then, inverts an output signal $Vo_{i_v}$ every time the subject voltage Vs exceeds a threshold voltage Vth in the positive direction or the negative direction.

More specifically, in a voltage drop due to avalanche multiplication in accordance with incidence of the photon onto the light receiving element 400, the inverter 402 inverts the output signal $Vo_{i_v}$ at a first timing at which the voltage Vs crosses the threshold voltage Vth. Then, the light receiving element 400 is charged by the recharge operation, and thus, the voltage Vs is increased. The inverter 402 again inverts the output signal $Vo_{i_v}$ at a second timing at which the increasing voltage Vs crosses the threshold voltage Vth. The width of the time direction between the first timing and the second timing corresponds to an output pulse that is in accordance with incidence of the photon onto the light receiving element 400.

The output pulse corresponds to the pixel signal that is asynchronously output from the pixel array unit 100 described above with reference to FIG. 4. In FIG. 4, the converting unit 110 converts this output pulse to the time information that indicates a timing at which the subject output pulse is supplied, and then, passes the time information to the generating unit 111. The generating unit 111 generates a histogram on the basis of the time information.

Figure 6:
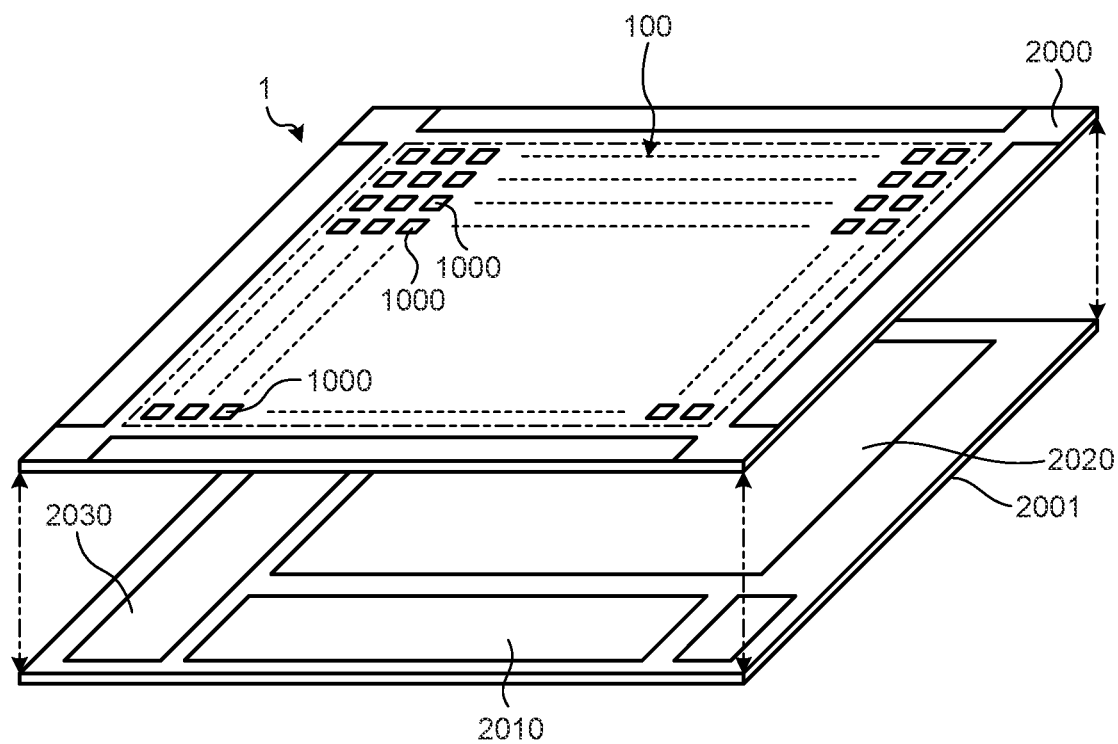
FIG. 6 is a schematic diagram illustrating an example of a configuration of a device applicable to the ranging apparatus according to each of the embodiments.

FIG. 6 is a schematic diagram illustrating an example of a configuration of a device applicable to the ranging apparatus 1 according to each of the embodiments. In FIG. 6, the ranging apparatus 1 is configured such that a light receiving chip 2000 and a logic chip 2001, each of which is constituted by a semiconductor chip, are laminated. Furthermore, in FIG. 5, for an explanation, the light receiving chip 2000 and the logic chip 2001 are illustrated in a separate state.

On the light receiving chip 2000, the light receiving elements 400 included in the respective pixels 10 are arrayed in the area of the pixel array unit 100 in a two-dimensional grid manner. Furthermore, the transistor 401 and the inverter 402 are formed in the pixel 10 on the logic chip 2001. Both ends of the light receiving element 400 are connected between the light receiving chip 2000 and the logic chip 2001 via a connecting unit (not illustrated) formed of, for example, a copper-copper connection (CCC) or the like.

The logic chip 2001 is provided with a logic array unit 2020 that includes a signal processing unit that processes the signal acquired by the light receiving element 400. It is possible to further provide, on the logic chip 2001, a signal processing circuit unit 2010, which processes the signal acquired by the light receiving element 400, and an apparatus control unit 2030, which controls an operation as the ranging apparatus 1, at a position close to the logic array unit 2020.

For example, the signal processing circuit unit 2010 is able to include the ranging processing unit 101 described above. Furthermore, the apparatus control unit 2030 is able to include the pixel control unit 102, the overall control unit 103, the clock generating unit 104, the light emission control unit 105, and the interface 106.

Furthermore, the configuration on each of the light receiving chip 2000 and the logic chip 2001 is not limited to this. Furthermore, in addition to controlling the logic array unit 2020, it is possible to arrange the apparatus control unit 2030 at a position close to, for example, the light receiving element 400 for the purpose of driving or controlling the other elements. In addition to the arrangement illustrated in FIG. 6, it is possible to arrange the apparatus control unit 2030 in an arbitrary area of the light receiving chip 2000 and the logic chip 2001 so as to have an arbitrary function.

(Configuration Used in Existing Technique)

Figure 7:
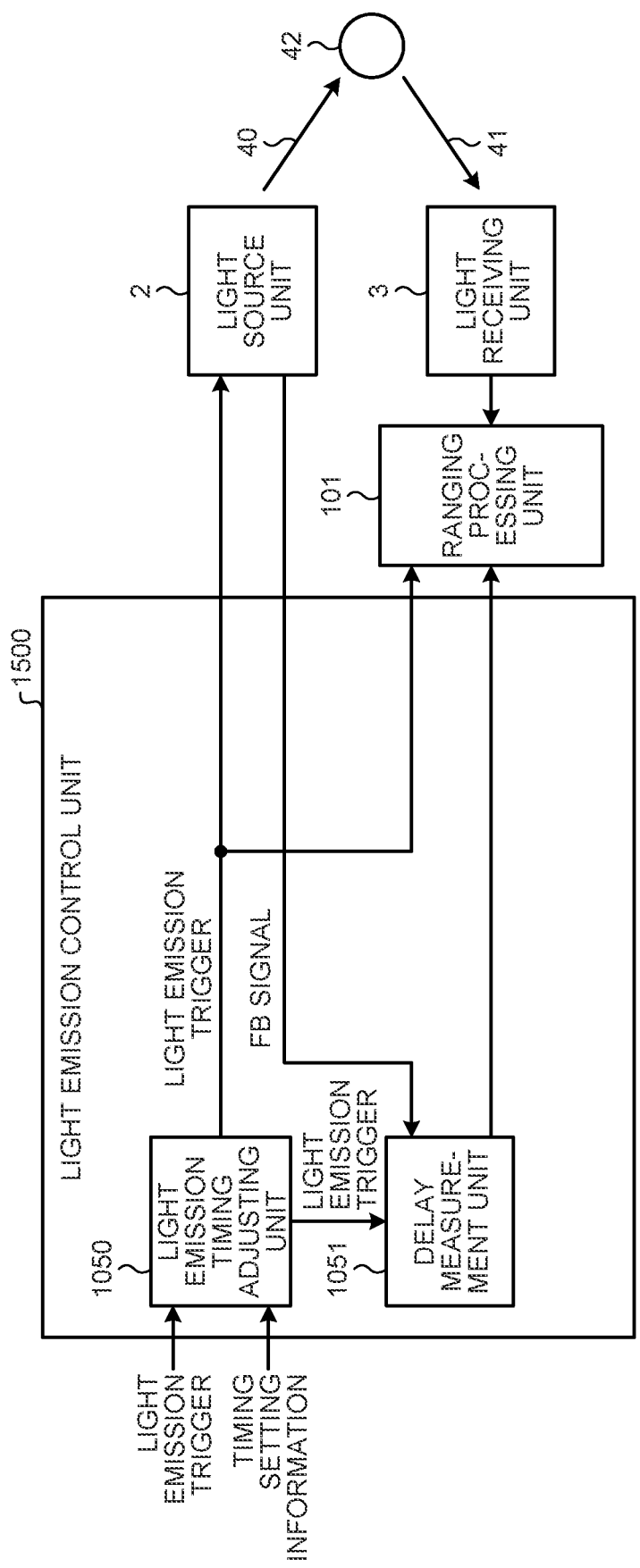
FIG. 7 is a block diagram illustrating a configuration of an example of a light emission control unit according to an existing technique.

In the following, before an explanation of the present disclosure, an example of a configuration used in an existing technique will be described. FIG. 7 is a block diagram illustrating a configuration of an example of a light emission control unit 1500 used in the existing technique and that corresponds to the light emission control unit 105 illustrated in FIG. 4. In FIG. 7, the light emission control unit 1500 includes a light emission timing adjusting unit 1050 and a delay measurement unit 1051.

The light emission timing adjusting unit 1050 issues a light emission trigger for causing the light source unit 2 to emit light on the basis of, for example, an external trigger signal that is supplied from the outside of the ranging apparatus 1 and timing setting information that is supplied from the overall control unit 103. For example, the light emission timing adjusting unit 1050 adjusts the timing of the light emission trigger signal on the basis of the timing setting information and issues the light emission trigger. The light emission trigger that has issued by the light emission timing adjusting unit 1050 is supplied to each of the light source unit 2, the delay measurement unit 1051, and the ranging processing unit 101 (see FIG. 4).

The light source unit 2 emits light in accordance with the supplied light emission trigger, and then, outputs the emitted light as emission light 40. The emission light 40 is reflected by, for example, an object to be measured 4 and is output from the object to be measured 4 as reflected light 41. A light receiving unit 3 supplies the pixel signal to the ranging processing unit 101 in accordance with light received. The light received by the light receiving unit 3 possibly include the reflected light 41 that is reflected by the object to be measured 4. The ranging processing unit 101 converts the supplied pixel signal to the time information (the light receiving time $t_m$) using the converting unit 110 and passes the time information to the generating unit 111. The generating unit 111 generates a histogram on the basis of the received time information, and the signal processing unit 112 calculates the distance D to the object to be measured 4 on the basis of the generated histogram.

Figure 8:
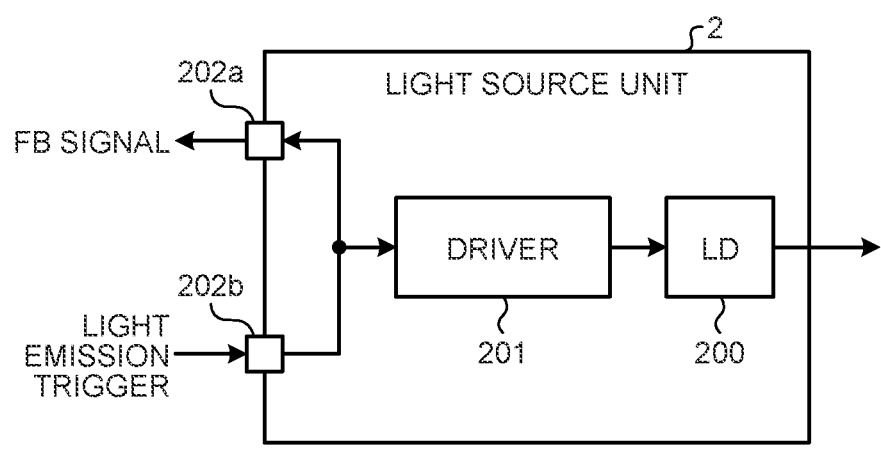
FIG. 8 is a block diagram illustrating a configuration of an example of a light source unit applicable to each of the embodiments.

FIG. 8 is a block diagram illustrating a configuration of an example of the light source unit 2 applicable to each of the embodiments. In FIG. 8, the light source unit 2 includes a laser diode (LD) 200 that is a light source and a driver 201 that drives the LD 200. The light emission trigger that is output from the light emission timing adjusting unit 1050 is supplied to the driver 201 via a terminal 202b. The driver 201 drives the LD 200 in accordance with the light emission trigger and causes the LD 200 to emit light. Furthermore, the light emission trigger supplied to the terminal 202b passes the interior of the light source unit 2 and is then output from a terminal 202a as a feedback (FB) signal. The FB signal is a signal that indicates a timing at which the LD 200 emits light in accordance with the light emission trigger. The FB signal is input to the light emission control unit 105.

A description will be given here by referring back to FIG. 7. The FB signal that is input from the light source unit 2 to the light emission control unit 105 is supplied to the delay measurement unit 1051. The delay measurement unit 1051 measures, on the basis of the light emission trigger supplied from the light emission timing adjusting unit 1050 and the FB signal supplied from the light source unit 2, an amount of delay of the timing, which has been issued by the light source unit 2, relative to the timing at which the light emission trigger is issued by the light emission timing adjusting unit 1050. The delay measurement unit 1051 supplies the measured amount of delay to the ranging processing unit 101.

As described above, when the ranging processing unit 101 generates a histogram in the generating unit 111, the ranging processing unit 101 is able to generate the histogram on the basis of the time information that is corrected on the basis of correction information supplied from the light emission control unit 105. The ranging processing unit 101 generates the histogram in the generating unit 111 by using the amount of delay measured by the delay measurement unit 1051 as the correction information.

Namely, if the time that indicates the amount of delay measured by the delay measurement unit 1051 is denoted by an amount of delay $FB_{dly}$, the ranging processing unit 101 calculates the distance D to the object to be measured 4 on the basis of Equation (2) below that is transformed from Equation (1).

$$D=(c/2)\times\{(t_{em}-FB_{dly})-t_{re}\} \quad (2)$$

An example of the relationship between the light emission trigger and the FB signal will be described with reference to FIG. 8. In the light source unit 2, the light emission trigger that is input from the terminal 202b is supplied to the driver 201, and the driver 201 drives the LD 200 in accordance with the light emission trigger to cause the LD 200 to emit light. The LD 200 generate heat at the time of emission of light and delay of a signal occurs in the interior of the light source unit 2. Accordingly, the LD 200 emits light that is delayed relative to the input timing of the light emission trigger with respect to the driver 201.

In contrast, the light emission trigger passes through the interior of the light source unit 2 from the terminal 202b and is output from the terminal 202a as the FB signal. At this time, the signal that is transmitted on a path from the terminal 202b to the terminal 202a is delayed by being pulled on the driver 201 side in accordance with the delay occurring in the driver 201. The delayed signal is output from the terminal 202a as the FB signal. In this way, in accordance with the delay of the light emission timing of the LD 200 relative to the light emission trigger, the FB signal that is output from the terminal 202a is delayed relative to the light emission trigger that is input to the terminal 202b.

Here, noise, such as random noise, is mixed into the FB signal due to heat generated in the interior of the light source unit 2, disturbance in the path of the FB signal, or the like. If noise, such as random noise, is mixed into the FB signal, the input timing of the FB signal that is input to the delay measurement unit 1051 possibly varies. If the input timing of the FB signal varies, detection accuracy of a delay of the FB signal with respect to the light emission trigger is reduced, the reduction in accuracy causes a reduction in measurement accuracy performed by the ranging processing unit 101.

Furthermore, for example, a case in which the amount of delay measured by the delay measurement unit 1051 is output to the outside via an interface (for example, the I/F 106) is considered. In this case, if an interval of the light emission trigger is short, an output of the amount of delay to the outside may possibly be delayed.

[First Embodiment] In the following, a first embodiment according to the present disclosure will be described. In the first embodiment, a representative value of a plurality of amounts of delay, which are measured on the basis of the light emission triggers that are output several times and a plurality of FB signals that are received with respect to the respective light emission triggers that are output several times, is obtained. The obtained representative values is passed to the ranging processing unit 101 as the amount of delay of the light emission triggers that are output several times.

As a representative value, an average value (arithmetic mean), a median value, a mode value, or the like may be used. The representative value applicable to the first embodiment is not limited to this. For example, it is conceivable to use weighting or the like together with the average value, the median value, the mode value, or the like. Furthermore, in a case of using an average value, it is possible to use a method for excluding the maximum value and the minimum value, a method for excluding values outside of a predetermined range in accordance with, for example, a normal distribution, or the like.

In the following, for an explanation, a description will be given with the assumption that an average value (arithmetic mean) is used as a representative value.

FIG. 9 is a block diagram illustrating a configuration of an example of a light emission control unit according to the first embodiment. In FIG. 9, a light emission control unit 105a has a configuration in which a representative value calculating unit 1052 is added to the light emission control unit 1500 illustrated in FIG. 7. The representative value calculating unit 1052 receives a supply of the amount of delay measured by the delay measurement unit 1051 and receives a supply of the light emission trigger from the light emission timing adjusting unit 1050. Furthermore, a synchronization signal is supplied to the representative value calculating unit 1052 from the outside. The synchronization signal is a clock signal CLK generated in, for example, the clock generating unit 104.

The representative value calculating unit 1052 accumulates, in accordance with the synchronization signal, the amounts of delay supplied from the delay measurement unit 1051 up to the number of times designated in advance. If the amounts of delay corresponding to the number of times designated in advance are accumulated, the representative value calculating unit 1052 calculates an average value of the amounts of delay by dividing the accumulated amounts of delay by the number of designated times. The representative value calculating unit 1052 passes the calculated average value of the amounts of delay to the ranging processing unit 101. The ranging processing unit 101 is able to use the calculated average value of the amounts of delay as the correction information that is used to correct the time information at the time of generating a histogram.

Because the amount of delay is the average value of the plurality of amounts of delay, variations in the plurality of amounts of delay are reduced in this value. Therefore, the ranging processing unit 101 is able to correct the time information by using the value in which variations in the plurality of amounts of delay due to noise or the like is reduced, it is possible to perform ranging with higher accuracy. Here, noise includes random noise that is included in the FB signal or includes noise generated in accordance with the state of the light source unit 2. Furthermore, the noise generated in accordance with the state of the light source unit 2 includes noise caused by heat generated in accordance with light emitted by the LD 200 in the light source unit 2. Furthermore, the random noise includes random noise that is generated in the interior of the ranging apparatus 1 or noise mixed from the outside of the ranging apparatus 1.

Figure 10A:
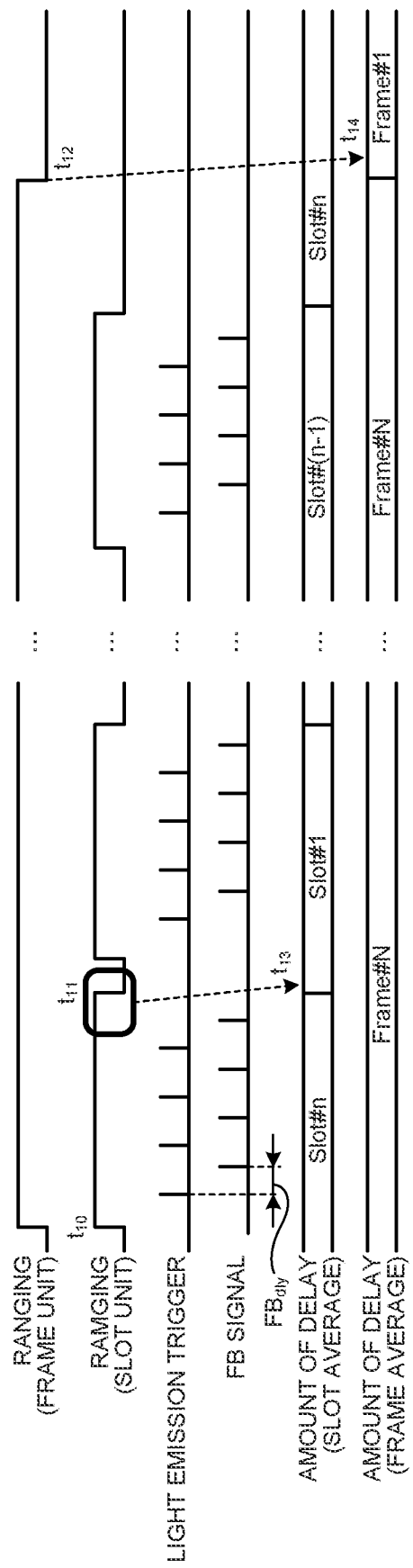
FIG. 10A is a sequence chart of an example illustrating an operation of the light emission control unit according to the first embodiment.
Figure 10B:
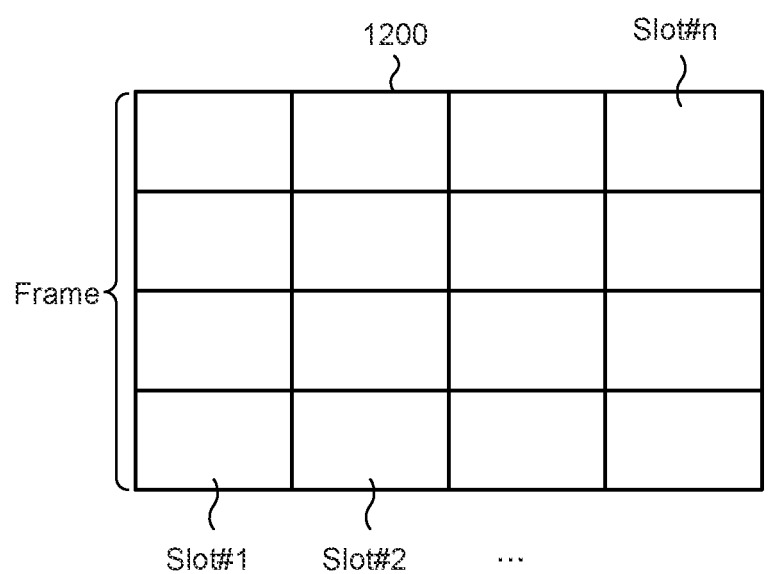
FIG. 10B is a diagram illustrating frames Frame and slots Slot applicable to the first embodiment.

A method for calculating a representative value of the amounts of delay according to the first embodiment will be described in more detail with reference to FIGS. 10A and 10B. FIG. 10A is a sequence chart illustrating an example of an operation of the light emission control unit 105a according to the first embodiment. FIG. 10A illustrates, from the upper part, a ranging period in units of frames Frame, a ranging period in units of slots Slot, a light emission trigger, a FB signal, a representative value output period in units of slots Slot, and a representative value output period in units of frames Frame.

Here, the frame Frame and the slot Slot that are applicable to the first embodiment will be described with reference to FIG. 10B. In FIG. 10B, a pixel area 1200 is an area in which the pixels 10 that are effective for ranging are arranged from among the plurality of pixels 10 arranged in the pixel array unit 100. Here, it is assumed that the pixel area 1200 is an area that includes all of the pixels 10 that are arranged in the pixel array unit 100.

The frame Frame includes the entire area of the pixel area 1200. In contrast, the slot Slot indicates each of the areas corresponding to a plurality of divisions of the frame Frame. In the example illustrated in FIG. 10B, n slots Slot of slots Slot #1, Slot #2, . . . , and Slot #n are formed by dividing the frame Frame into the units of blocks. Each of the slots Slot #1, Slot #2, . . . , and Slot #n are arithmetic addition areas for performing addition of the time information at the time of, for example, generating a histogram in the generating unit 111.

A description will be given here by referring back to FIG. 10A. At time $t_{10}$, a period of time of the target frame to be targeted is started and a period of time of the target slot Slot (for example, a slot Slot #1) that is a slot targeted for ranging first time in a period of time of the target frame. The light emission timing adjusting unit 1050 issues, in the target slot Slot, the light emission trigger the number of times designated in advance, for example, several tens of times to several hundreds of times, or more. The light emission trigger is issued as a pulse signal with, for example, a predetermined time width.

The light source unit 2 emits light in accordance with the light emission trigger issued by the light emission timing adjusting unit 1050 and outputs a FB signal in accordance with the emission light. The FB signal is output as the pulse signal having a time width associated with, for example, the time width of the pulse signal of the light emission trigger. Each of the FB signals that are output from the light source unit 2 is supplied to the delay measurement unit 1051.

The delay measurement unit 1051 measures the amount of delay $FB_{dly}$ of the FB signal associated with the subject light emission trigger relative to the issue timing of the light emission trigger issued by the light emission timing adjusting unit 1050 and passes the measured amount of delay to the representative value calculating unit 1052. The representative value calculating unit 1052 accumulates the amounts of delay $FB_{dly}$ passed from the delay measurement unit 1051 up to the number of accumulations that is designated in advance. The number of accumulations corresponds to the number of issues of the light emission trigger issued in, for example, a single slot Slot.

If the period of time of the target slot Slot at, for example, time $t_{11}$ is ended, the representative value calculating unit 1052 divides the amounts of delay accumulated in the subject target slot Slot (defined as a slot accumulation amount of delay) by the number of accumulations and calculates an average value of the amounts of delay $FB_{dly}$ (defined as a slot average amount of delay) in the subject target slot Slot. The representative value calculating unit 1052 stores the calculated slot average amount of delay as the representative value of the amount of delay of the target slot Slot in, for example, a slot purpose register held by the representative value calculating unit 1052, and then, updates the content of the register (time $t_{13}$). The representative value stored in the updated slot purpose register is acquired by, for example, the ranging processing unit 101 in a period of time before the content of the slot purpose register is updated next time.

The process described above performed on the target slot Slot is performed on each of the slots Slot #1, Slot #2, . . . , and Slot #n in the frame Frame while switching the target slot Slot. If the period of time of the frame Frame (target frame Frame) that is targeted at time $t_{12}$ is ended, the representative value calculating unit 1052 calculates an average value (defined as a frame average amount of delay) of the amounts of delay in the subject target frame Frame by using all of the amounts of delay $FB_{dly}$ in all of the slots Slot included in the subject target frame Frame. The representative value calculating unit 1052 stores the calculated frame average amount of delay as the representative value of the amount of delay of the target frame Frame in, for example, a frame purpose register held by the representative value calculating unit 1052, and then, updates the content of the register (time $t_{14}$). The representative value stored in the updated register is acquired by, for example, the ranging processing unit 101 in a period of time before the content of the frame purpose register is updated next time.

Figure 11:
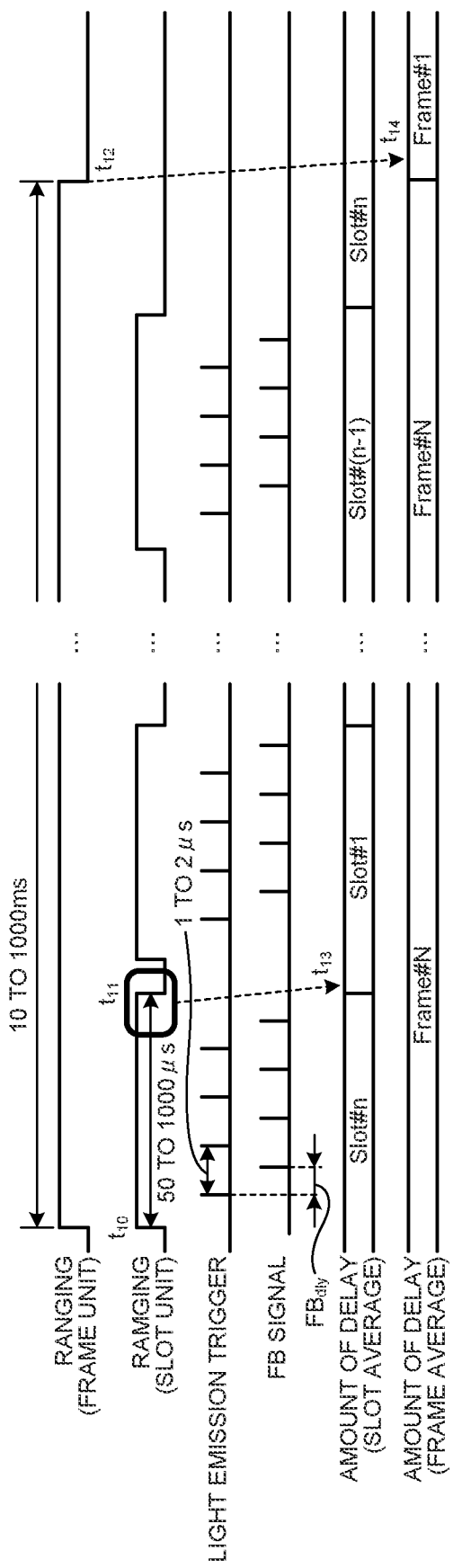
FIG. 11 is a diagram illustrating effects obtained from an amount-of-delay acquiring process according to the first embodiment.

FIG. 11 is a diagram illustrating the effects of the amount-of-delay acquiring process according to the first embodiment. Furthermore, the units illustrated in FIG. 11 are substantially the same as the units illustrated in FIG. 10A described above; therefore, descriptions in detail will be omitted here.

As illustrated in FIG. 11, a period of time of a single slot Slot is 50 [µs] to 1000 [µs] relative to a period of time of a single frame Frame of about 10 [ms] to 1000 [ms]. Because the light emission trigger is issued several tens of times to several hundreds of times in the period of the single slot Slot, an interval of the FB signal associated with the light emission trigger is about, for example, 1 [µs] to 2 [µs]. As in the existing technique, if the amount of delay $FB_{dly}$ is output for each FB signal, a communication process needs to be performed in units of 1 [µs] to 2 [µs] and it is thus difficult to output the amount of delay $FB_{dly}$ to the outside by using a MIPI or a register read.

In contrast, in the first embodiment, a representative value of the amounts of delay $FB_{dly}$ in a slot Slot, or, a representative value of the amounts of delay $FB_{dly}$ in a frame Frame is calculated and is output as the amount of delay $FB_{dly}$ that is used by, for example, the ranging processing unit 101. Accordingly, the light emission control unit 105a according to the first embodiment is able to output the amount of delay $FB_{dly}$ in units of slots Slot (50 [µs] to 1000 [µs]), or in units of frames Frame (10 [ms] to 1000 [ms]). Therefore, by using the light emission control unit 105a according to the first embodiment, it is possible to make the process performed on the amount of delay $FB_{dly}$ easy as compared to the existing technique.

Configuration in the First Embodiment in More Detail

Figure 12:
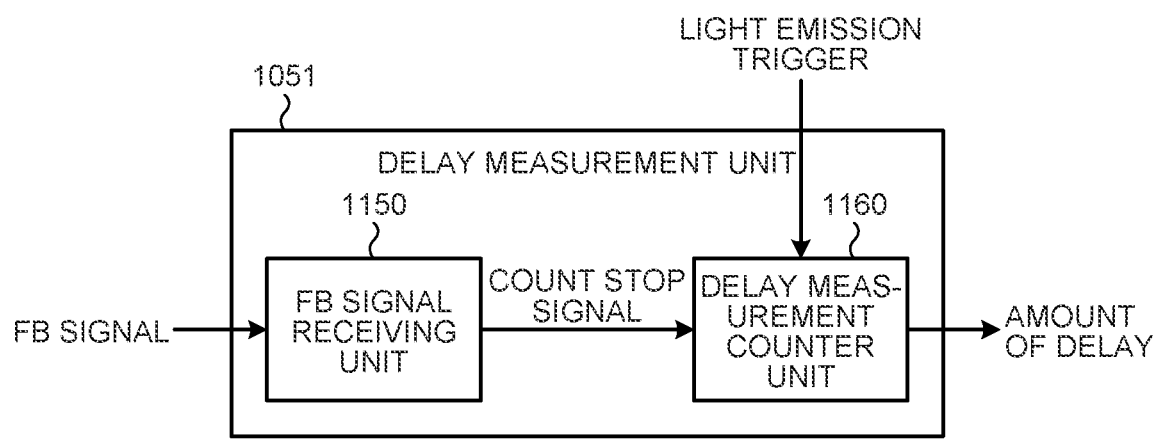
FIG. 12 is a block diagram illustrating a configuration of an example of a delay measurement unit according to the first embodiment.

In the following, a configuration of the light emission control unit 105a according to the first embodiment will be described in more detail. FIG. 12 is a block diagram illustrating the configuration of an example of the delay measurement unit 1051 according to the first embodiment.

In FIG. 12, the delay measurement unit 1051 includes a FB signal receiving unit 1150 and a delay measurement counter unit 1160. The delay measurement unit 1051 receives an FB signal and outputs a count stop signal in accordance with reception of the FB signal. The delay measurement counter unit 1160 receives a supply of the light emission trigger from the light emission timing adjusting unit 1050. Furthermore, the delay measurement counter unit 1160 receives a supply of the count stop signal from the FB signal receiving unit 1150. The delay measurement counter unit 1160 includes a counter that performs counting in accordance with, for example, a clock signal, starts a count by using the counter at the timing at which the light emission trigger is supplied, and stops the count in accordance with the count stop signal that is supplied from the FB signal receiving unit 1150. It is possible to obtain the amount of delay $FB_{dly}$ relative to the light emission trigger of the FB signal by converting the count value at the time point, at which the count is stopped, to the time information.

Figure 13:
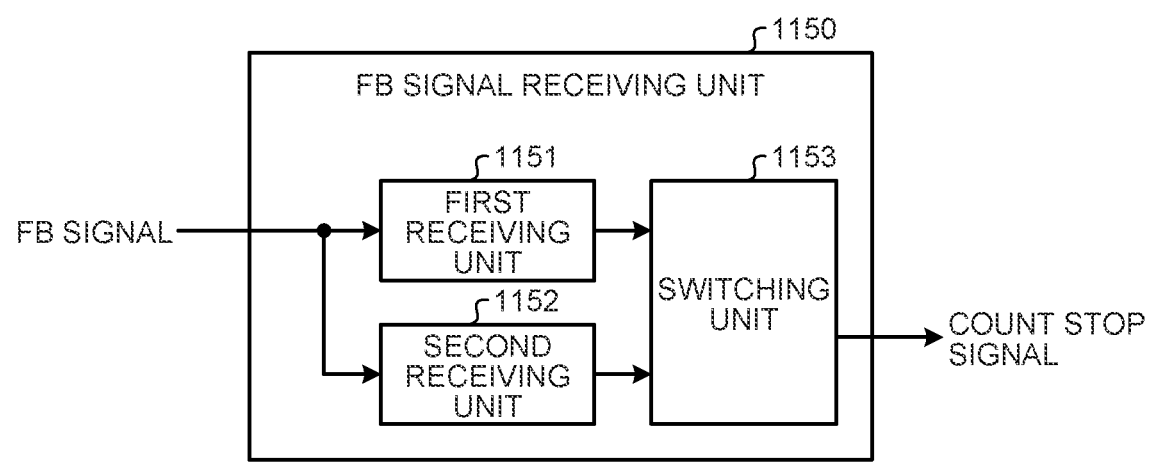
FIG. 13 is a block diagram illustrating a configuration of an example of a FB signal receiving unit according to the first embodiment.

FIG. 13 is a block diagram illustrating a configuration of an example of the FB signal receiving unit 1150 according to the first embodiment. In FIG. 13, the FB signal receiving unit 1150 includes a first receiving unit 1151, a second receiving unit 1152, and a switching unit 1153.

The FB signal is input to each of the first receiving unit 1151 and the second receiving unit 1152. Each of the first receiving unit 1151 and the second receiving unit 1152 generates a count stop signal on the basis of the input FB signal. The count stop signal that is output from each of the first receiving unit 1151 and the second receiving unit 1152 is input to the switching unit 1153.

Here, the second receiving unit 1152 is configured such that the pulse width of the FB signal conforms to a case of a pulse width that is narrower than the pulse width that can be controlled by the first receiving unit 1151. The switching unit 1153 selects, in accordance with the pulse width of the FB signal that is set by, for example, the overall control unit 103 (see FIG. 4), the count stop signal that is output from one of the first receiving unit 1151 and the second receiving unit 1152 and outputs the selected count stop signal to the delay measurement counter unit 1160.

Figure 14:
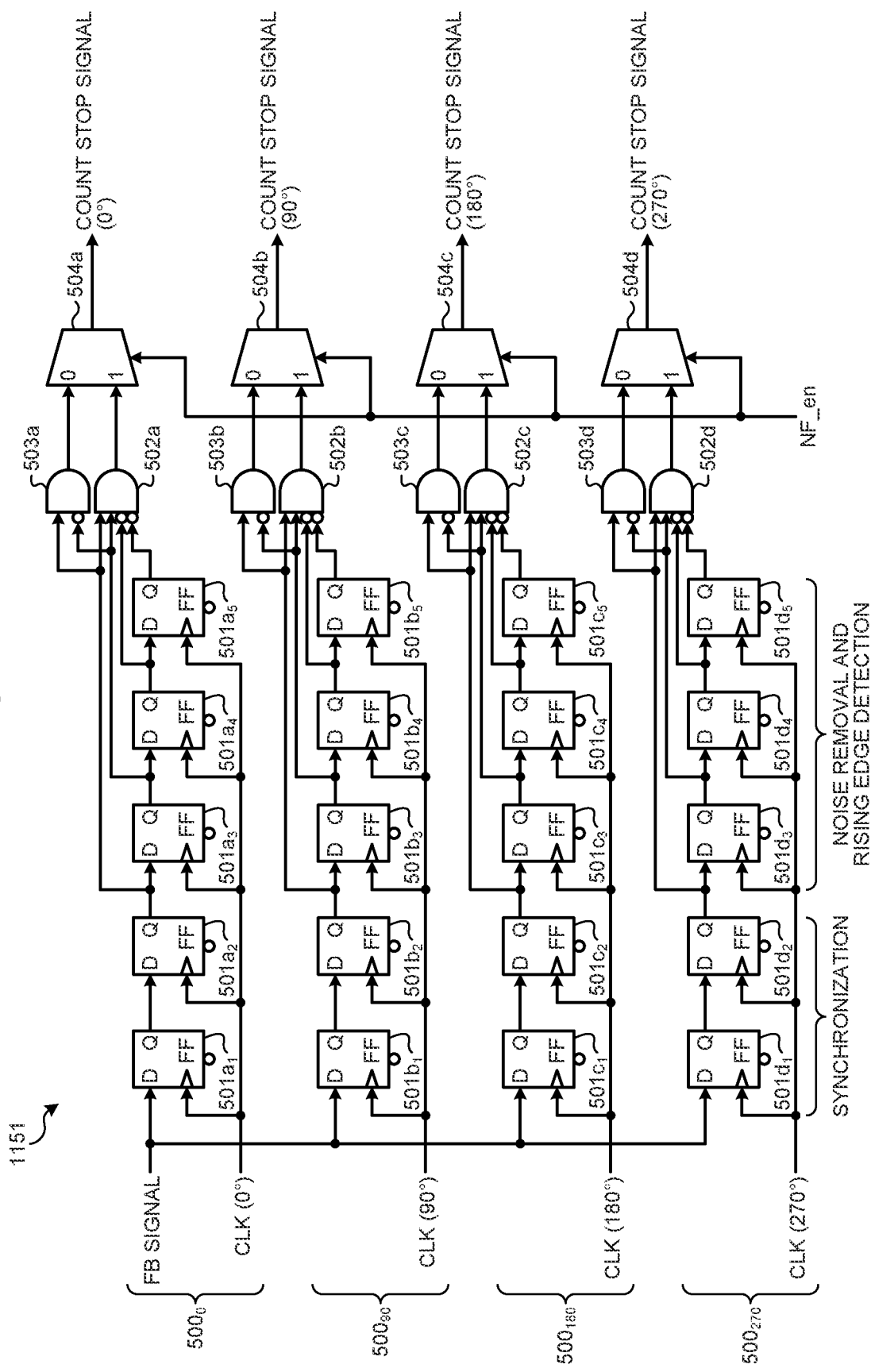
FIG. 14 is a circuit diagram illustrating a configuration of an example of a first receiving unit applicable to the first embodiment.

FIG. 14 is a circuit diagram illustrating a configuration of an example of the first receiving unit 1151 applicable to the first embodiment. Here, in the first receiving unit 1151 and the second receiving unit 1152, in order to conform to an interval of the FB signal, four-phase clock signals CLK obtained by shifting the phase of the clock signals CLK by 90° are used. A clock signal CLK whose phase is not shifted is referred to as a clock signal CLK (0°), and the clock signals CLK whose phases are shifted by 90°, 180°, and 270° are referred to as a clock signal CLK (90°), a clock signal CLK (180°), and a clock signal CLK (270°), respectively.

In this way, by using a plurality of clock signals CLK obtained by shifting the phase of the clock signals CLK, it is possible to perform a process at a frequency that is higher than the clock frequency of the clock signal CLK. For example, if the clock frequency of the clock signal CLK is 500 [MHz], by using four phases of the clock signal CLK (0°), the clock signal CLK (90°), the clock signal CLK (180°), and the clock signal CLK (270°) whose phases are shifted by 90° for each clock signal CLK, it is possible to implement a process operating with the clock frequency of 2 [GHz].

In FIG. 14, the first receiving unit 1151 includes measurement units $500_0$, $500_{90}$, $500_{180}$, and $500_{270}$ for measuring the amount of delay $FB_{dly}$ in association with the clock signal CLK (0°), the clock signal CLK (90°), the clock signal CLK (180°), and the clock signal CLK (270°), respectively, described above.

The first receiving unit 1151 is applied in a case in which the pulse width of the FB signal is greater than or equal to the clock cycle of the clock signal CLK. For example, if the clock frequency of the clock signal CLK is 500 [MHz], the first receiving unit 1151 is applied to the FB signal having the pulse width that is greater than or equal to 2 [ns].

In the example illustrated in FIG. 14, the measurement unit $500_0$ includes a shift register constituted by five D-FF circuits $501a_1$, $501a_2$, $501a_3$, $501a_4$, and $501a_5$, a 4-input AND circuit 502a, a 2-input AND circuit 503a, and a selector 504a.

Similarly to the measurement units $500_{90}$, $500_{180}$, and $500_{270}$, the same configuration as that of the measurement unit $500_0$ is applied. Namely, the measurement unit $500_{90}$ includes a shift register constituted by five D-FF circuits $501b_1$, $501b_2$, $501b_3$, $501b_4$, and $501b_5$, a 4-input AND circuit 502b, a 2-input AND circuit 503b, and a selector 504b.

The measurement unit $500_{180}$ includes a shift register constituted by five D-FF circuits $501c_1$, $501c_2$, $501c_3$, $501c_4$, and $501c_5$, a 4-input AND circuit 502c, a 2-input AND circuit 503c, and a selector 504c. Furthermore, the measurement unit $500_{270}$ includes a shift register constituted by five D-FF circuits $501d_1$, $501d_2$, $501d_3$, $501d_4$, and $501d_5$, a 4-input AND circuit 502d, a 2-input AND circuit 503d, and a selector 504d.

The clock signal CLK (0°) is input to the measurement unit $500_0$, and is input to the clock input end of each of the D-FF circuits $501a_1$ to $501a_5$ included in the shift register. The clock signal CLK (90°) is input to the measurement unit $500_{90}$, and is input to the clock input end of each of the D-FF circuits $501b_1$ to $501b_5$ included in the shift register. The clock signal CLK (180°) is input to the measurement unit $500_{180}$, and is input to the clock input end of each of the D-FF circuits $501c_1$ to $501c_5$ included in the shift register. Similarly, the clock signal CLK (270°) is input to the measurement unit $500_{270}$, and is input to the clock input end of each of the D-FF circuits $501d_1$ to $501d_5$ included in the shift register.

Furthermore, the FB signal is asynchronously and commonly input to each of the measurement units $500_0$ to $500_{270}$. Each of the measurement units $500_0$ to $500_{270}$ performs sampling on the input FB signal on the basis of each of the input clock signals CLK (0°) to CLK (270°), and performs rising edge detection.

In each of the measurement units $500_0$ to $500_{270}$, each of the AND circuits 502a, 502b, 502c, and 502d implements a noise filtering function. If the measurement unit $500_0$ is used as an example of a description, the outputs of the D-FF circuits $501a_2$ and $501a_3$ are input to two non-inverting inputs out of the four inputs of the AND circuit 502a. In contrast, the outputs of the D-FF circuit $501a_4$ and $501a_5$ are input to two inverting inputs out of the four inputs of the AND circuit 502a. The noise filter using the AND circuit 502a outputs a signal in a case of taking a value corresponding to an amount equal to two clock of the clock signal CLK (0°). More specifically, if the values that are output from the D-FF circuits $501a_2$, $501a_3$, $501a_4$, and $501a_5$ is "1100", the AND circuit 502a outputs a value of "1".

In contrast, in each of the measurement units $500_0$ to $500_{270}$, the associated AND circuits 503a, 503b, 503c, and 503d outputs a value of "1" in accordance with the rising edge of each of the FB signal and does not include the noise filtering function.

In each of the measurement units $500_0$ to $500_{270}$, the associated selectors 504a, 504b, 504c, and 504d selects, in accordance with, for example, a selection signal NF_en supplied from the overall control unit 103, an output to which the noise filtering function is applied and an output to which the noise filtering function is not applied. For example, in the measurement unit $500_0$, one of the output of the AND circuit 502a and the output of the AND circuit 503a is selected and the selected output is output as a count stop signal (0°).

In a case of using the noise filtering function, the overall control unit 103 supplies the selection signal NF_en for selecting the AND circuits 502a to 502d to the selectors 504a to 504d, respectively. In contrast, in a case of using the noise filtering function, the overall control unit 103 supplies the selection signal NF_en for selecting the AND circuits 503a to 503d to the selectors 504a to 504d, respectively.

An output of the selector 504a is output as the count stop signal (0°) that is detected in the phase 0°. The measurement units $500_0$ to $500_{270}$ output the count stop signals (0°) to (270°), respectively, that are detected in the respective phases 0°, 90°, 180°, and 270°.

Figure 15:
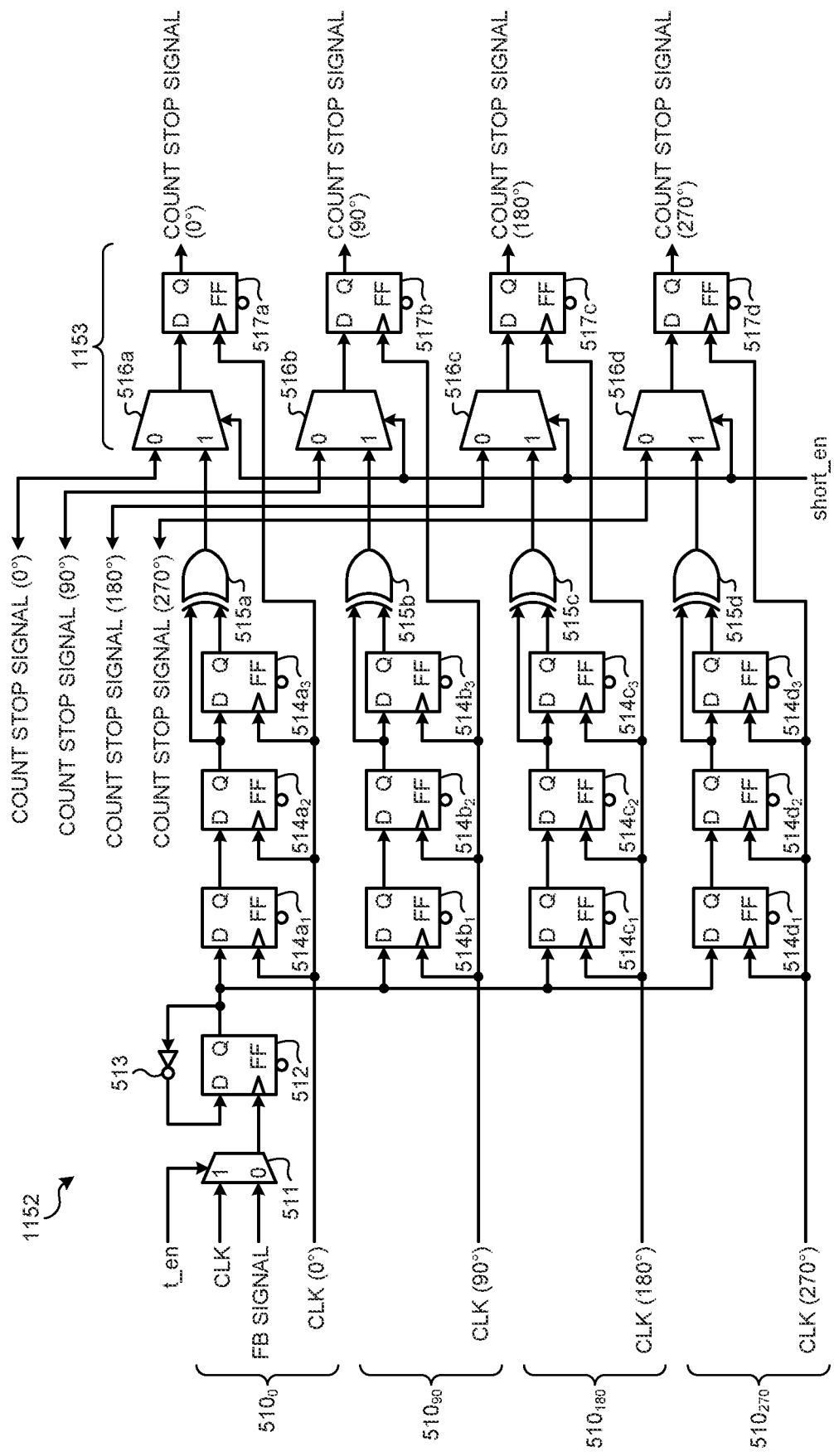
FIG. 15 is a circuit diagram illustrating a configuration of an example of a second receiving unit and a switching unit according to the first embodiment.

There may be a case in which, in the first receiving unit 1151 described above, if the pulse width of the FB signal is less than the clock cycle of the clock signal CLK, sampling of the FB signal is not normally performed. FIG. 15 is a circuit diagram illustrating a configuration of an example of the second receiving unit 1152 and the switching unit 1153 according to the first embodiment. The second receiving unit 1152 is configured so as to be capable of reacting when the pulse width of the FB signal is less than the clock cycle of the clock signal CLK.

In FIG. 15, the second receiving unit 1152 includes measurement units $510_0$, $510_{90}$, $510_{180}$, and $510_{270}$ for measuring the amount of delay $FB_{dly}$ associated with the clock signal CLK (0°), the clock signal CLK (90°), the clock signal CLK (180°), and the clock signal CLK (270°), respectively, described above.

The second receiving unit 1152 is applied when the pulse width of the FB signal is less than the pulse width of the clock signal. For example, if the clock frequency of the clock signal CLK is 500 [MHz], the second receiving unit 1152 is applied to the FB signal having a pulse width that is less than 2 [ns].

In the example illustrated in FIG. 15, the measurement unit $510n$ includes an input unit that includes a selector 511, a D-FF circuit 512, and an inverter 513; a shift register constituted by three D-FF circuits $514a_1$, $514a_2$, and $514a_3$; and an XOR circuit 515a.

Regarding the measurement units $510_{90}$, $510_{180}$, and $510_{270}$, a configuration in which the input unit included in the measurement unit $510_0$ is excluded is applied. Namely, the measurement unit $510_{90}$ includes a shift register constituted by three D-FF circuits $514b_1$, $514b_2$, and $514b_3$ and an XOR circuit 515b. The measurement unit $510_{180}$ includes a shift register constituted by three D-FF circuits $514c_1$, $514c_2$, and $514c_3$ and an XOR circuit 515c. Furthermore, the measurement unit $510_{270}$ includes a shift register constituted by three D-FF circuits $514d_1$, $514d_2$, and $514d_3$ and an XOR circuit 515d.

In the input unit included in the measurement unit $510_0$, the clock signal CLK and the FB signal are input to the selector 511. The FB signal side is selected by the selection signal t_en, and the FB signal that is output from the selector 511 is input to the clock input end of the D-FF circuit 512. An output of the D-FF circuit 512 is taken from the output end thereof and the output end is connected to the data input end. Consequently, a signal that inverts an output of the D-FF circuit 512 at the rising edge of the FB signal is generated.

An output signal of the D-FF circuit 512 is commonly input to each of the shift registers included in the associated measurement units $510_0$ to $510_{270}$. The clock signals CLK (0°) to CLK (270°) are input to the clock input ends of the shift registers included in the measurement units $510_0$ to $510_{270}$, respectively.

In each of the measurement units $510_0$ to $510_{270}$, sampling is performed on the signal that is output from the D-FF circuit 512 and that is commonly input in accordance with each of the input clock signals CLK (0°) to CLK (270°), and a changing point (rising edge and falling edge) of the subject signal is detected. In a case of the measurement units $510_0$ as an example, each of an input and an output of the D-FF circuit $514a_3$, which is the final stage from among the D-FF circuits $514a_1$ to $514a_3$ included in the shift register, is input to the XOR circuit 515a. If one of the input and output of the D-FF circuit 514a is "1" and the other one of the input and output of the D-FF circuit 514a is "0", an output of the XOR circuit 515a becomes "1", and a changing point of the signal is detected.

Figure 16:
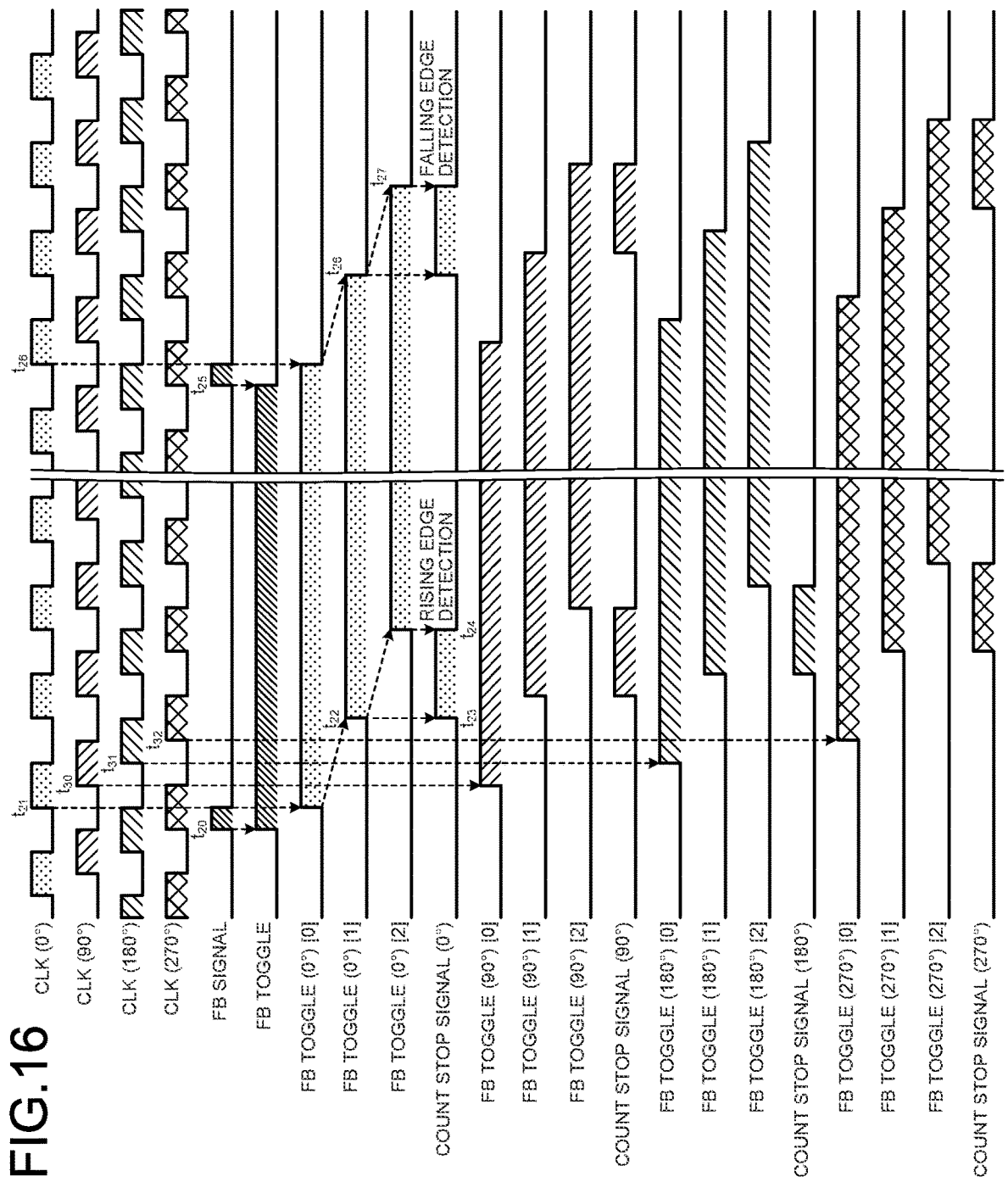
FIG. 16 is a sequence chart illustrating an example of a state of a signal in each of the measurement units according to the first embodiment.

FIG. 16 is a sequence chart illustrating an example of a state of the signal in each of the measurement units $510_0$ to $510_{270}$ according to the first embodiment. FIG. 16 illustrates, from the upper part, each of the clock signals CLK (0°), CLK (90°), CLK (180°), and CLK (270°), a FB signal, and each of outputs (FB toggles) of the D-FF circuit 512. Furthermore, FIG. 16 illustrates each of the outputs of the D-FF circuits $514a_1$, $514a_2$, and $514a_3$ (FB toggle (0°) for [0], [1], and [2]) included in the measurement unit $510_0$ and an output of the XOR circuit 515a (count stop signal (0°)).

Subsequently, FIG. 16 illustrates, regarding each of the measurement units $510_{90}$ to $510_{270}$, FB toggle ((90°), for [0], [1], and [2]), and the count stop signal (90°); the FB toggle ((180°) for [0], [1], and [2]), and the count stop signal (180°); and the FB toggle ((270°) for [0], [1], and [2]), and the count stop signal (270°), respectively.

Each of the signals will be described by using, as an example, a measurement unit 510a that includes the input unit. The FB signal is input to the clock input end of the D-FF circuit 512 whose output end and the data input end are connected to the inverter 513 (time $t_{20}$). An output of the D-FF circuit 512 rises in accordance with the rising edge of the FB signal and maintains a high state until a next FB signal is input (FB toggle). This output of the D-FF circuit 512 is synchronized with the clock signal CLK (0°) at time $t_{21}$ in the D-FF circuit $514a_1$ (the FB toggle (0°) [0]). An output of the D-FF circuit $514a_1$ is delayed in accordance with the clock signal CLK (0°) in the D-FF circuit $514a_2$ (time $t_{22}$, FB toggle (0°) [1]), and is further delayed in the D-FF circuit $514a_3$ (FB toggle (0°) [2]).

At time $t_{23}$, the signal (FB toggle (0°) [1]) of one end of the input end of the XOR circuit 515a enters a high state. At the time $t_{23}$, because signal (FB toggle (0°) [2]) of the other end of the input end is a low state, an output of the XOR circuit 515a is changed from the low state to the high state (the time $t_{23}$). If the FB toggle (0°) [2] enters a high state at time $t_{24}$, each of the one end and the other end of the input end of the XOR circuit 515a enters a high state, and an output of the XOR circuit 515a is changed from the high state to the low state. In this way, the count stop signal (0°) is in the high state in a period of time between the time $t_{23}$ and the time $t_{24}$, and the rising edge detection in accordance with the FB signal is performed.

If a next FB signal is input at time $t_{25}$, an output (the FB toggle (0°)) of the D-FF circuit 512 is changed from the high state to the low state. This output of the D-FF circuit 512 is synchronized with the clock signal CLK (0°) at time $t_{26}$ in the D-FF circuit $514a_1$ (the FB toggle (0°) [0]). The output of the D-FF circuit $514a_1$ is delayed in accordance with the clock signal CLK (0°) in the D-FF circuit $514a_2$ (the time $t_{26}$ and the FB toggle (0°) [1]), and is further delayed in the D-FF circuit $514a_3$ (time $t_{27}$, and the FB toggle (0°) [2]).

At the time $t_{26}$, the signal (FB toggle (0°) [1]) of one end of the input end of the XOR circuit 515a enters a low state. At the time $t_{26}$, the signal (the FB toggle (0°) [2]) of the other end of the input end is in the high state, so that the output of the XOR circuit 515a is changed from the low state to the high state (the time $t_{26}$). If the FB toggle (0°) [2] enters a low state at the time $t_{27}$, each of the one end and the other end of the input end of the XOR circuit 515a enters the low state, and an output of the XOR circuit 515a is changed from the high state to the low state. The count stop signal (0°) is in a high state in a period of time between the time $t_{26}$ and the time $t_{27}$, the rising edge detection in accordance with the FB signal is performed.

If the pulse width of the FB signal is already known, on the basis of the rising edge detection in the period of time between the time $t_{23}$ and the time $t_{24}$ described above, it is possible to acquire the count stop signal (0°) in accordance with the reception timing of the FB signal. The same applies to falling edge detection in a period of time between the time $t_{26}$ and the time $t_{27}$.

The same also applies to the measurement units 510b to 510d. Namely, an output of the D-FF circuit 512, in which a high state is maintained between an input of the FB signal and an input of the next FB signal, is synchronized with the clock signals CLK (90°), CLK (180°), and CLK (270°) at time $t_{30}$, $t_{31}$, and $t_{32}$ (the FB toggle (90°) [0], the FB toggle (180°) [0], and the FB toggle (270°) [0]), respectively. After that, it is possible to acquire the count stop signals (90°), (180°), and (270°) by performing the same operation as that performed by the measurement unit 510a described above.

In each of the measurement units $510_0$ to $510_{270}$, an output of each of the associated XOR circuits 515a to 515d is supplied to the switching unit 1153. The switching unit 1153 includes selectors 516a, 516b, 516c, and 516d and D-FF circuits 517a, 517b, 517c, and 517d in association with the clock signals CLK (0°) to CLK (270°), respectively.

An output of each of the selectors 516a, 516b, 516c, and 516d is input to the data input end of the associated D-FF circuits 517a, 517b, 517c, and 517d on a one-to-one basis. The clock signals CLK (0°) to CLK (270°) are input to the clock input ends of the D-FF circuits 517a to 517d, respectively.

An output of each of the measurement units 510a, 510b, 510c, and 510d is input to one of the input end of the associated selectors 516a, 516b, 516c, and 516d. Furthermore, the count stop signals (0°), (90°), (180°) and (270°) that are output from the respective measurement units 500a, 500b, 500c, and 500d, which has been described with reference to FIG. 14, are input to the other ends of the input ends of the selectors 516a, 516b, 516c, and 516d, respectively, on a one-to-one basis.

Each of the selectors 516a to 516d selects, in accordance with, for example, the selection signal short_en supplied from the overall control unit 103, one end or the other end of the input end. If, for example, the pulse width of the FB signal is less than the pulse width of the clock signal CLK, each of the selectors 516a to 516d selects one end of the input end in accordance with the selection signal short_en. Consequently, the outputs of the measurement units 510a to 510d in the second receiving unit 1152 are output, from the switching unit 1153 as the count stop signals (0°), (90°), (180°), and (270°) of the phases, respectively.

Furthermore, if, for example, the pulse width of the FB signal is greater than or equal to the pulse width of the clock signal CLK, each of the selectors 516a to 516d selects the other end of the input end in accordance with the selection signal short_en. Consequently, of the outputs of the measurement units 500a to 500d included in the first receiving unit 1151 are output from the switching unit 1153 as the count stop signals (0°), (90°), (180°), and (270°) of the phases, respectively.

The count stop signals (0°), (90°), (180°), and (270°) of the respective phases that are output from the FB signal receiving unit 1150 are supplied to the delay measurement counter unit 1160.

Figure 17:
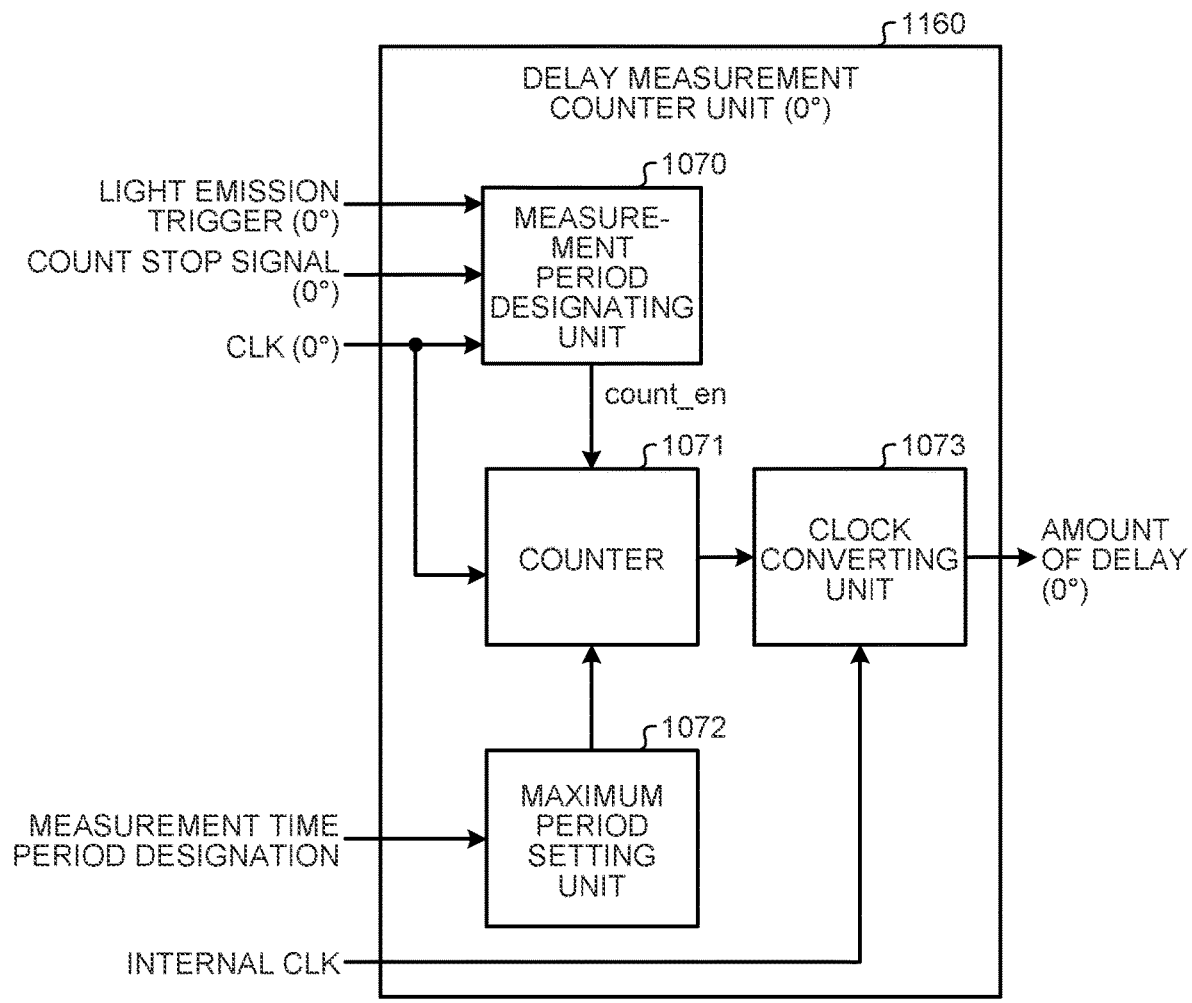
FIG. 17 is a functional block diagram illustrating an example of a function of a delay measurement counter unit according to the first embodiment.

FIG. 17 is an example of a functional block diagram illustrating a function of the delay measurement counter unit 1160 applicable to the first embodiment. Furthermore, the delay measurement unit 1051 includes the delay measurement counter unit 1160 for each of the phases 0°, 90°, 180°, and 270° of the clock signal CLK. Each of the count stop signals (0°), (90°), (180°), and (270°) of the phases that is output from the FB signal receiving unit 1150 is input to each of the delay measurement counter units 1160 associated with the phases on a one-to-one basis. Furthermore, each of a light emission trigger (0°), a light emission trigger (90°), a light emission trigger (180°), and a light emission trigger (270°), which are obtained by shifting the phase of the light emission trigger supplied from the light emission timing adjusting unit 1050 by 0°, 90°, 180°, and 270°, respectively, is input to the respective delay measurement counter units 1160 associated with the respective phases on a one-to-one basis.

Each of the delay measurement counter units 1160 associated with the respective phases has the same configuration and the operation thereof is in common except in that the phase of each of the signals is different; therefore, in a description below, the delay measurement counter unit 1160 (illustrated as the delay measurement counter unit (0°) in the drawing) associated with the phase 0° will be described as an representative description.

In FIG. 17, the delay measurement counter unit 1160 includes a measurement period designating unit 1170, a counter 1071, a maximum period setting unit 1072, and a clock converting unit 1073.

The measurement period designating unit 1170 receives an input of the light emission trigger (0°), the count stop signal (0°), and the clock signal CLK (0°). The measurement period designating unit 1170 generates, on the basis of the light emission trigger (0°) and the count stop signal (0°), a signal count_en that is used to designate a count period in the counter 1071. Here, it is assumed that the signal count_en is a signal that enters a high state when the light emission trigger (0°) is input and enters a low state when the count stop signal (0°) is input.

The counter 1071 receives a supply of the signal count_en from a measurement period designating unit 1070 and receives an input of the clock signal CLK (0°). The counter 1071 is reset at the timing at which the signal count_en is changed from the low state to the high state, and starts a count in accordance with the clock signal CLK (0°). After the count is started, if the signal count_en is changed from the high state to the low state, the counter 1071 stops the count and outputs a count value. The count value that is output from the counter 1071 is supplied to the clock converting unit 1073 and is output from the delay measurement counter unit (0°) in accordance with an internal clock CLK in the device. The count value that is output from the clock converting unit 1073 corresponds to the amount of delay $FB_{dly}$ (0°) in a case of the phase 0°.

In the delay measurement counter unit 1160, the maximum period setting unit 1072 sets, in accordance with, for example, a measurement period designation signal supplied from the overall control unit 103, the maximum time period for which a count is performed in the counter 1071.

In this way described above, the amounts of delay $FB_{dly}$ (0°), $FB_{dly}$ (90°), $FB_{dly}$ (180°), and $FB_{dly}$ (270°) of the respective phases are output from the respective delay measurement counter units 1160 associated with the respective phases. The delay measurement unit 1051 takes logical disjunction of, for example, the amounts of delay $FB_{dly}$ (0°), $FB_{dly}$ (90°), $FB_{dly}$ (180°), and $FB_{dly}$ (270°) of the respective phases, and outputs the obtained result as the amount of delay $FB_{dly}$.

Figure 18:
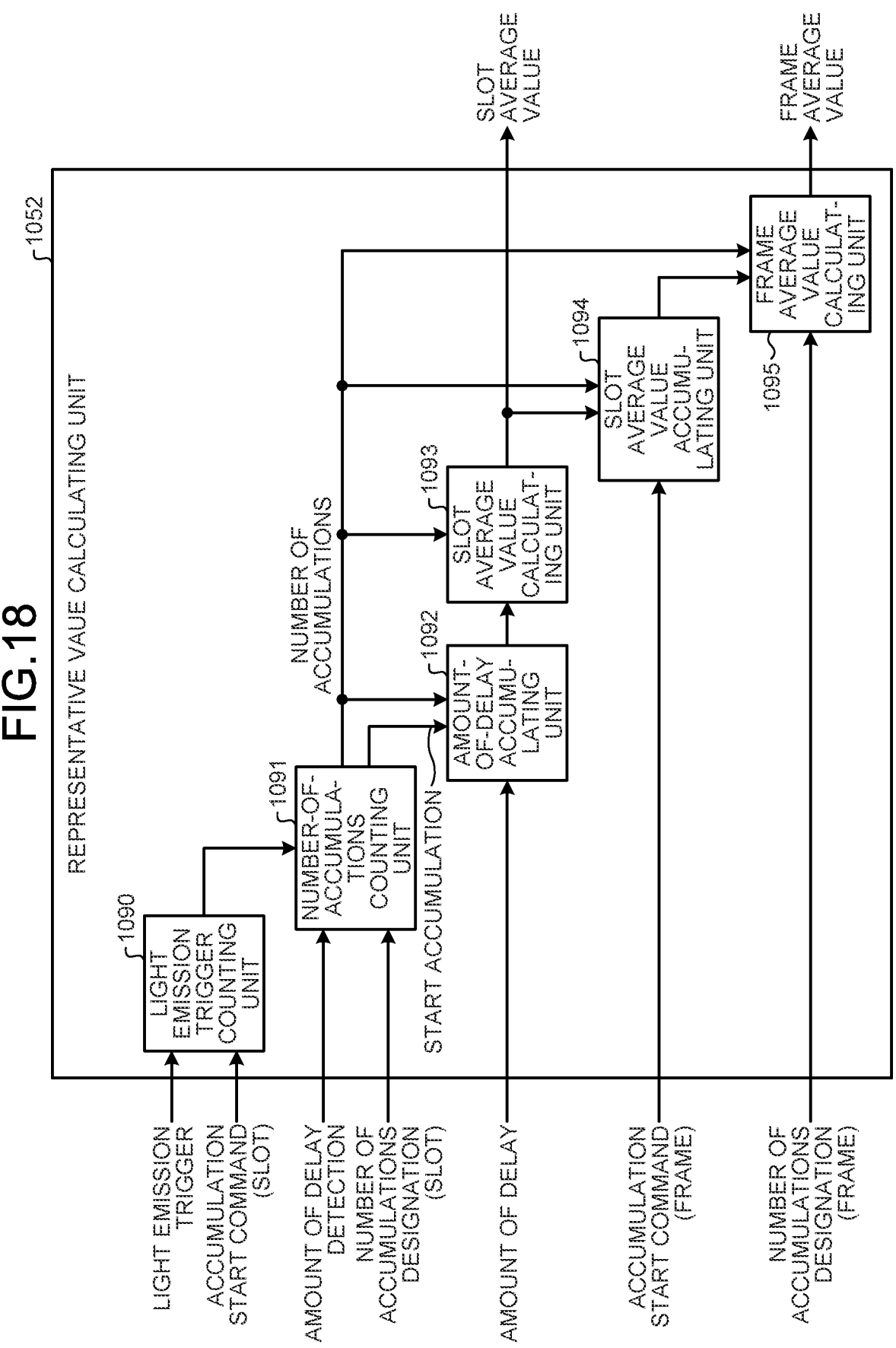
FIG. 18 is a functional block diagram illustrating an example of a function of a representative value calculating unit according to the first embodiment.

FIG. 18 is an example of a functional block diagram illustrating a function of the representative value calculating unit 1052 according to the first embodiment. In FIG. 18, the representative value calculating unit 1052 includes a light emission trigger counting unit 1090, a number-of-accumulations counting unit 1091, an amount-of-delay accumulating unit 1092, a slot average value calculating unit 1093, a slot average value accumulating unit 1094, and a frame average value calculating unit 1095.

The light emission trigger counting unit 1090 receives a supply of the light emission trigger from the light emission timing adjusting unit 1050. Furthermore, the light emission trigger counting unit 1090 receives from, for example, the overall control unit 103 (see FIG. 4), an input of an accumulation start command that designates a start of accumulation of the amounts of delay $FB_{dly}$ of a single slot. For example, the overall control unit 103 outputs the accumulation start command on the basis of the number of issues of the light emission trigger after the issue of the light emission trigger is started, and supplies the light emission trigger to the light emission trigger counting unit 1090.

The light emission trigger counting unit 1090 counts the number of light emission triggers and supplies, if the number of counted light emission triggers reaches the number of issues of the light emission triggers designated by the accumulation start command, an accumulation start designation that instructs to start accumulate the amounts of delay $FB_{dly}$ of a single slot to the number-of-accumulations counting unit 1091. Consequently, the representative value calculating unit 1052 is able to start accumulate the amounts of delay $FB_{dly}$ at the timing that is designated by the accumulation start designation.

The number-of-accumulations counting unit 1091 receives a supply of number-of-accumulations designation information that designates the number of accumulations of a single slot from, for example, the overall control unit 103. Furthermore, the number-of-accumulations counting unit 1091 receives a supply of an amount-of-delay detection signal. For example, when the delay measurement unit 1051 outputs the amount of delay $FB_{dly}$, the delay measurement unit 1051 outputs the amount-of-delay detection signal. The example is not limited to this and the number-of-accumulations counting unit 1091 may also determine that the amount-of-delay detection signal has been supplied on the condition that the amount of delay $FB_{dly}$ is input from the delay measurement unit 1051.

The number-of-accumulations counting unit 1091 counts, in accordance with the accumulation start designation supplied from the light emission trigger counting unit 1090, the number of amount-of-delay detection signals until the number of amount-of-delay detection signals reaches the number of accumulations that is indicated by the number-of-accumulations designation information. If the count of the amount-of-delay detection signal is started, the number-of-accumulations counting unit 1091 supplies, to the amount-of-delay accumulating unit 1092, the accumulation start designation that instructs to start the accumulation of the amounts of delay $FB_{dly}$. Furthermore, the number-of-accumulations counting unit 1091 supplies, on the basis of the number-of-accumulations designation information, the number of accumulations to each of the amount-of-delay accumulating unit 1092, the slot average value calculating unit 1093, the slot average value accumulating unit 1094 and the frame average value calculating unit 1095.

The amount-of-delay accumulating unit 1092 receives a supply of the amount of delay $FB_{dly}$ from the delay measurement unit 1051. The amount-of-delay accumulating unit 1092 starts to accumulate the amounts of delay $FB_{dly}$ in accordance with the accumulation start designation supplied from the number-of-accumulations counting unit 1091, and, if the number of accumulated amounts of delay $FB_{dly}$ reaches the number of accumulations that is supplied from the number-of-accumulations counting unit 1091, the accumulation of the amounts of delay $FB_{dly}$. Namely, the amount-of-delay accumulating unit 1092 accumulates the amounts of delay $FB_{dly}$ corresponding to an amount equal to a single slot and obtains the accumulated amount of delay $FB_{dly}$. The amount-of-delay accumulating unit 1092 passes the accumulation value of the amount of delay $FB_{dly}$ corresponding to an amount equal to a single slot to the slot average value calculating unit 1093.

The slot average value calculating unit 1093 divides the accumulation value of the amounts of delay $FB_{dly}$ corresponding to an amount equal to a single slot passed from the amount-of-delay accumulating unit 1092 by the number of accumulations supplied from the number-of-accumulations counting unit 1091 and calculates an average value (slot average value) of the amounts of delay $FB_{dly}$ in the single slot. The slot average value calculating unit 1093 holds the calculated slot average value and supplies the calculated slot average value to the ranging processing unit 101 as a representative value of the amounts of delay $FB_{dly}$ for each slot.

The slot average value accumulating unit 1094 receives a supply of the accumulation start command that instructs to start accumulation of the amounts of delay $FB_{dly}$ corresponding to an amount equal to a single frame from, for example, the overall control unit 103. If the slot average value accumulating unit 1094 determines that the accumulation of the amounts of delay $FB_{dly}$ corresponding to an amount equal to a single slot has been completed on the basis of the number of accumulations that is supplied from, for example, the number-of-accumulations counting unit 1091, the slot average value accumulating unit 1094 acquires the held slot average value from the slot average value calculating unit 1093 and performs accumulation.

The frame average value calculating unit 1095 receives a supply of the number-of-accumulations designation information that indicates the number of accumulations of the slot average value in a single frame from, for example, the overall control unit 103. If the frame average value calculating unit 1095 determines, on the basis of, for example, the number of accumulations supplied from the number-of-accumulations counting unit 1091 and the number of accumulations designated by the number-of-accumulations designation information, that the accumulation of the amounts of delay $FB_{dly}$ corresponding to an amount equal to a single frame has been completed, the frame average value calculating unit 1095 acquires the accumulated slot average value from the slot average value accumulating unit 1094. The frame average value calculating unit 1095 calculates a frame average value by dividing the accumulation value of the slot average value in a single frame acquired from the slot average value accumulating unit 1094 by the number of accumulations designated by the number-of-accumulations designation information. The frame average value calculating unit 1095 holds the calculated frame average value and supplies the calculated frame average value to the ranging processing unit 101 as a representative value of the amounts of delay $FB_{dly}$ for each frame.

Modification of First Embodiment

In the following, a modification of the first embodiment will be described. In the first embodiment described above, the representative value calculating unit 1052 calculates a representative value for each slot and each frame on the basis of the amount of delay $FB_{dly}$ of the FB signal with respect to the light emission trigger and supplies the calculated representative value to the ranging processing unit 101. The example is not limited to this and, for example, the representative value calculating unit 1052 may also generate a histogram on the basis of the amount of delay $FB_{dly}$ supplied from the delay measurement unit 1051.

Figure 19:
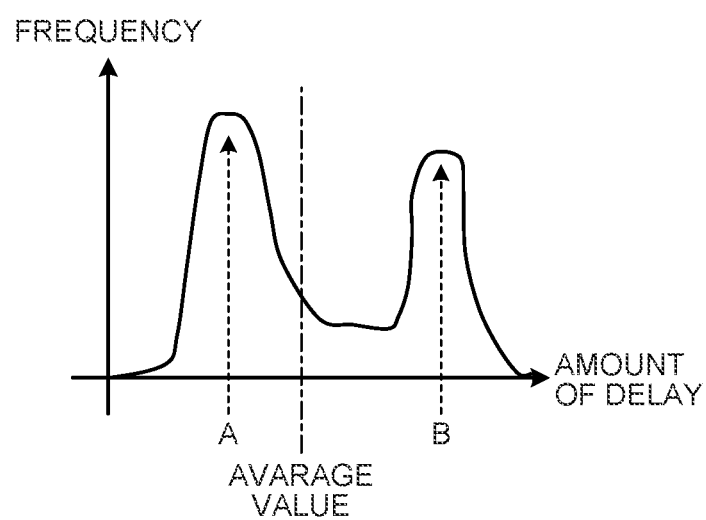
FIG. 19 is a diagram illustrating an amount-of-delay histogram obtained by an amount of delay $FB_{dly}$ according to a modification of the first embodiment.

FIG. 19 is a diagram illustrating an example of an amount-of-delay histogram generated on the basis of the amounts of delay $FB_{dly}$ according to the modification of the first embodiment. Furthermore, the amount-of-delay histogram illustrated in FIG. 19 is approximated by a curved line, the horizontal axis indicates the amount of delay $FB_{dly}$. In the example illustrated in FIG. 19, the amount of delay $FB_{dly}$ includes two frequency peaks, i.e., a peak A and a peak B that is smaller than the peak A. In contrast, the average value of the amounts of delay $FB_{dly}$ is, as exemplified in FIG. 19, located between the peak A and the peak B, and is closer to the peak A that is a larger peak between the peak A and the peak B. In this case, it is conceivable that the amount of delay $FB_{dly}$ that indicates, for example, the peak A is more reliable than the average value of the amounts of delay $FB_{dly}$.

The amount-of-delay histogram as illustrated in FIG. 19 is output from the representative value calculating unit 1052 and is supplied to the ranging processing unit 101. The ranging processing unit 101 is able to use, on the basis of the amount-of-delay histogram, the histogram as a correction value that is used when a histogram is generated by the generating unit 111 on the basis of the light receiving time $t_m$ assuming that, for example, the amount of delay $FB_{dly}$ that indicates the peak A is more reliable amount of delay $FB_{dly}$. Consequently, it is possible to perform ranging with higher accuracy by the ranging apparatus 1. Furthermore, the modification of the first embodiment corresponds to an example in which a mode value is used as a representative value.

Figure 20:
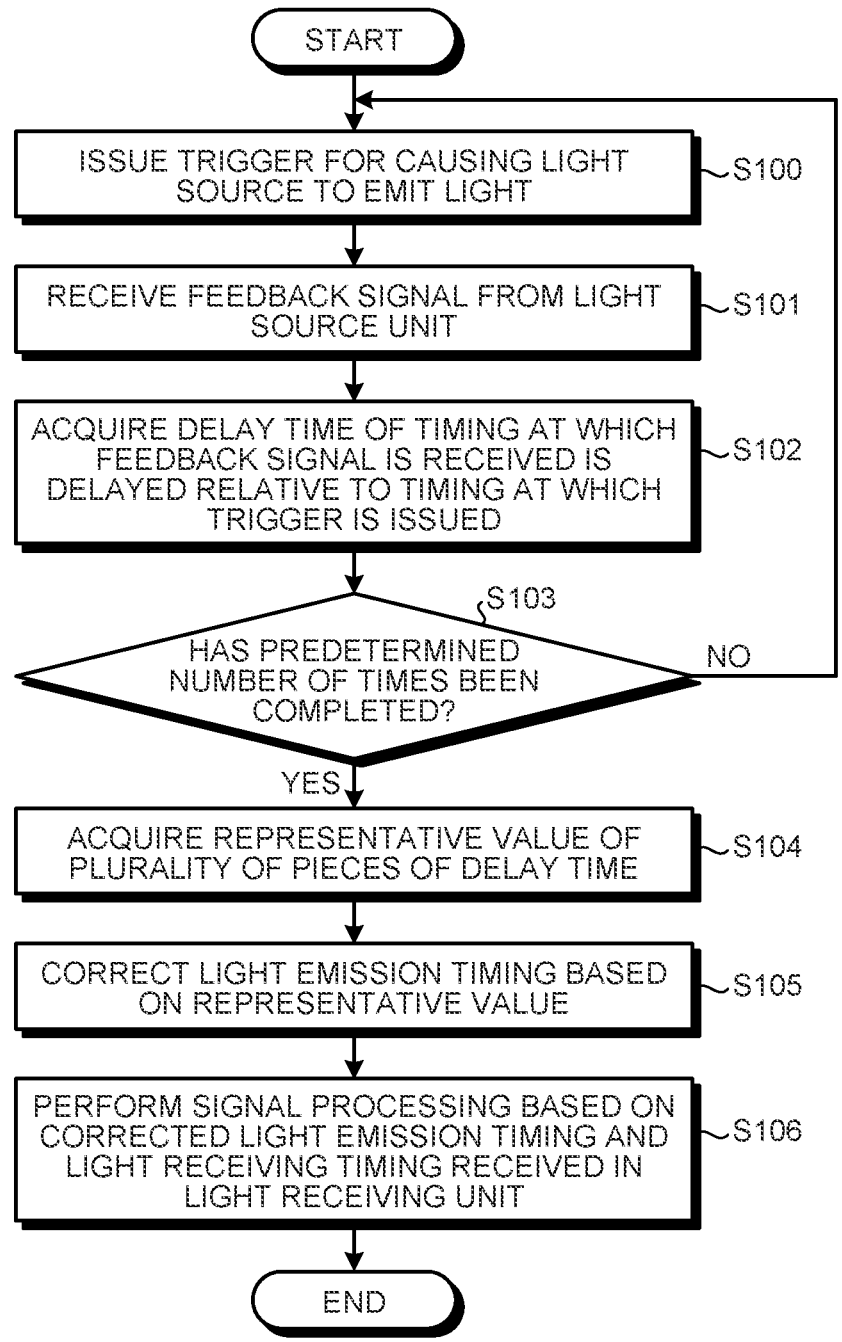
FIG. 20 is a flowchart illustrating an example of a light emission control process according to the first embodiment.

FIG. 20 is an example of a flowchart illustrating a light emission control process according to the first embodiment. At Step S100, the light emission control unit 105a issues the light emission trigger for causing the light source unit 2 by using the light emission timing adjusting unit 1050 to emit light. The light source unit 2 emits light in accordance with the light emission trigger and outputs the feedback (FB) signal.

At Step S101, the light emission control unit 105a receives, by using the delay measurement unit 1051, the FB signal that is output from the light source unit 2. At subsequent Step S102, the light emission control unit 105a acquires, by using the delay measurement unit 1051, the delay time of the reception timing, at which the FB signal is received by the delay measurement unit 1051 at Step S101, that is delayed relative to the issue timing at which the light emission trigger is issued by the light emission timing adjusting unit 1050 at Step S100.

At subsequent Step S103, the light emission control unit 105a determines whether the process at Step S100 to Step S102 has been performed a predetermined number of times. If the light emission control unit 105a determines that the subject process has not been performed the predetermined number of times ("No" at Step S103), the light emission control unit 105a returns the process to Step S100.

In contrast, if the light emission control unit 105a determines that the subject process has been performed the predetermined number of times ("Yes" at Step S103), the light emission control unit 105a proceeds the process to Step S104. At Step S104, the light emission control unit 105a acquires, by using the representative value calculating unit 1052, the representative value of a plurality of pieces of delay time acquired in accordance with the issue of the light emission trigger issued the predetermined number of times at Step S100 to Step S102.

At subsequent Step S104, the ranging processing unit 101 corrects, by using the representative value calculating unit 1052, the light emission timing in accordance with the light emission trigger that is issued at Step S100 on the basis of the representative value acquired at Step S104. At subsequent Step S105, the ranging processing unit 101 performs predetermined signal processing, such as generating a histogram of, for example, the light receiving time $t_m$ on the basis of the light emission timing that is corrected at Step S104 and the light receiving timing at the light receiving unit 3.

If the process at Step S104 has been performed, a series of the processes indicated by the flowchart illustrated in FIG. 2.

Second Embodiment

In the following, a second embodiment of the present disclosure will be described. The second embodiment is an example in which the ranging apparatus 1 has a plurality of light sources.

FIG. 21 is a block diagram illustrating an example of a configuration of a light emission control unit and a light source system according to the second embodiment. In FIG. 21, a light source system 203 includes a plurality of light source units $2_1$, $2_2$, . . . , and $2_n$ each having a LD 200 and a driver 201. Furthermore, in a light emission control unit 105b, a light emission timing adjusting unit 1050' issues a light emission trigger in association with each of the light source units $2_1$, $2_2$, and $2_n$. Each of the light source units $2_1$, $2_2$, . . . , and $2_n$ outputs a FB signal in a relationship of one to one with respect to each of the supplied light emission triggers.

Figure 22A:
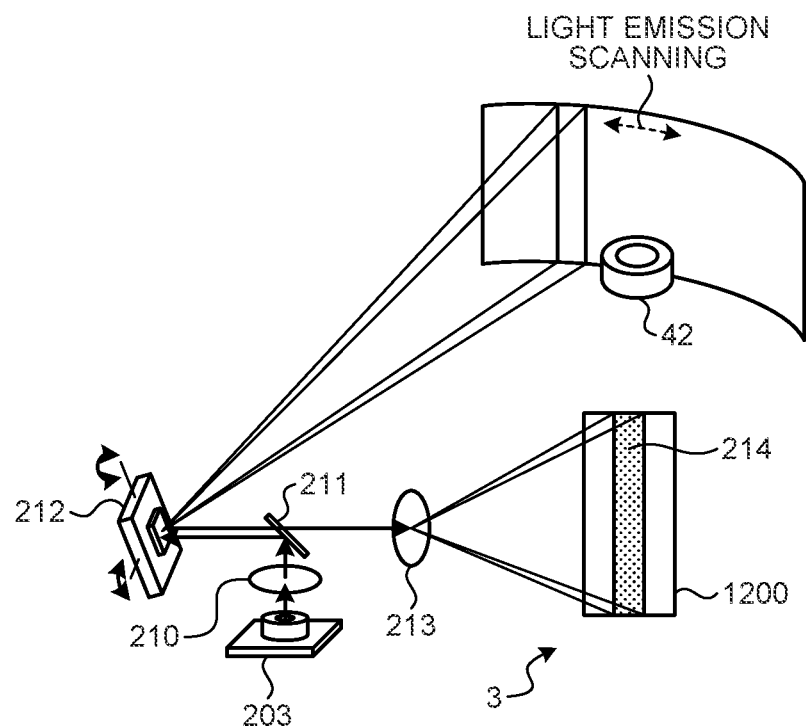
FIG. 22A is a diagram illustrating an example of scanning performed by a plurality of light source units applicable to the second embodiment.
Figure 22B:
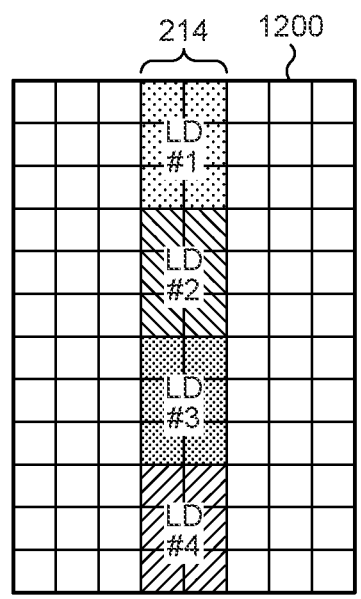
FIG. 22B is a diagram illustrating an example of scanning performed by the plurality of light source units applicable to the second embodiment.

FIGS. 22A and 22B are diagrams illustrating an example of scanning that is applicable to the second embodiment and that is performed by the plurality of the light source units 21, 22, . . . , and 2n. Light emission scanning applicable to the second embodiment will be schematically described with reference to FIG. 22A.

In FIG. 22A, in the light source system 203 that includes a plurality of the light sources unit $2_1$, $2_2$, . . . , and $2_n$, each of the light source units $2_1$, $2_2$, . . . , and $2_n$ emits light in accordance with a plurality of light emission triggers associated with one to one, a plurality of pieces of laser light are emitted. The plurality of pieces of laser light emitted from the light source system 203 is incident on a polarization beam splitter 211 passing through a collimator lens 210. Each of the pieces of laser light is reflected by the polarization beam splitter 211 and is incident on the micromirror 212. A Micro Electro Mechanical Systems (MEMS) is able to be applied to the micromirror 212. The micromirror 212 is able to change the direction of the reflected light in which the incident light is reflected in a predetermined angle range in accordance with control performed from the outside.

A part of the laser light that is emitted from the micromirror 212 as the reflected light is reflected by the object to be measured 4, and the reflected light irradiates the micromirror 212. The reflected light from the object to be measured 4 incident on a micromirror 212 is reflected by the micromirror 212 and is incident on the pixel area 1200 included in the pixel array unit 100 via a light receiving lens 213. Furthermore, in FIG. 22A, a part of the area of the pixel area 1200 is extracted.

FIG. 22B is a diagram illustrating an example in which the reflected light 41 based on the emission light 40 emitted from each of the plurality of the light source units $2_1$, $2_2$, . . . , and $2_n$ irradiates the pixel area 1200. Here, it is assumed that n=4 and the light source system 203 includes the four light source units $2_1$, $2_2$, . . . , and $2_n$. It is assumed that each of the pieces of the reflected light 41 based on the respective pieces of the emission light 40 of these respective light source units $2_1$, $2_2$, . . . , and $2_n$ irradiates each of the areas indicated by areas LD #1, LD #2, LD #3, and LD #4 illustrated in FIG. 22B.

For example, the area included in the pixel area 1200 irradiated with the reflected light 41 based on the emission light 40 of the light source unit $2_1$ corresponds to the area LD #1. Similarly, the area included in the pixel area 1200 irradiated with the reflected light 41 based on the emission light 40 of the light source unit $2_2$ corresponds to the area LD #2. Furthermore, in the example illustrated in FIG. 22B, an area 214 that includes the areas LD #1, LD #2, LD #3, and LD #4 is assumed as a single slot. The ranging processing unit 101 generates a histogram of each of the areas LD #1, LD #2, LD #3, and LD #4. The example is not limited to this and the ranging processing unit 101 may also collectively generate a histogram of the areas LD #1, LD #2, LD #3, and LD #4.

Figure 23:
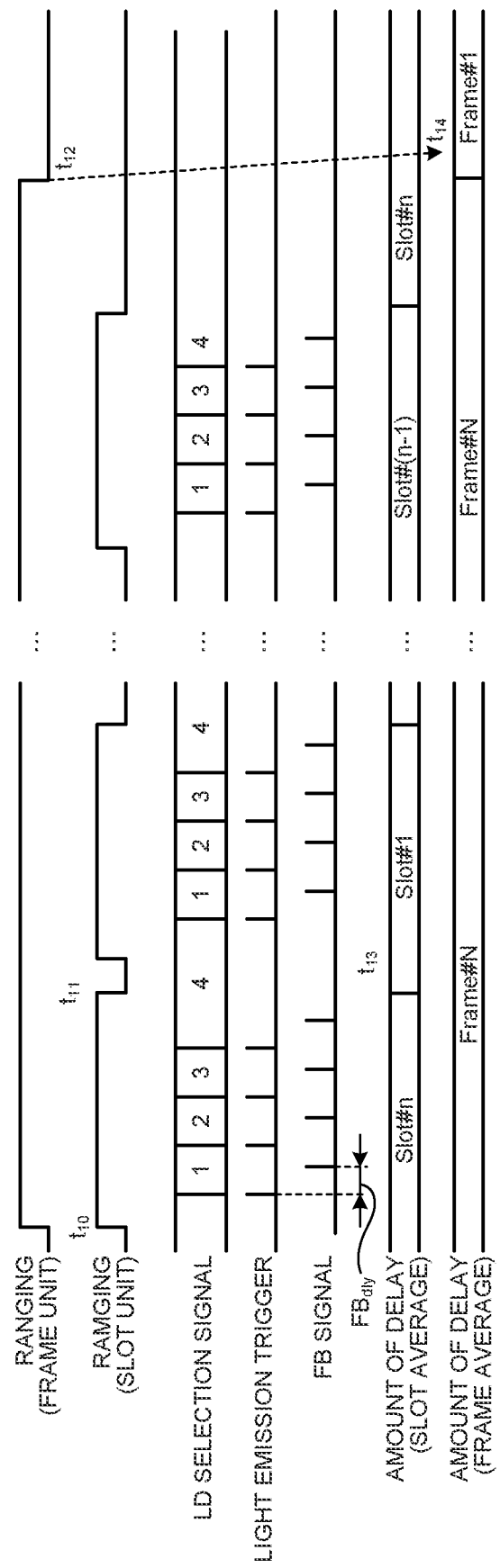
FIG. 23 is a sequence chart illustrating an example of an operation of the light emission control unit according to the second embodiment.

FIG. 23 is an example of a sequence chart illustrating an operation of the light emission control unit 105b according to the second embodiment. FIG. 23 illustrates, from the upper part, a ranging period in units of frames Frame, a ranging period in units of slots Slot, a LD selection signal, a light emission trigger, a FB signal, a representative value output period in units of slots Slot, and a representative value output period in units of frames Frame.

The LD selection signal is a signal for selecting the light source unit that is used to emit light from among the light source units $2_1$, $2_2$, . . . , and $2_n$, is generated by, for example, the light emission timing adjusting unit 1050', and is output to the light source system 203. A LD selection signal "1" designates a period for which the light source unit $2_1$ is selected, and a LD selection signal "2" designates a period for which the light source unit $2_2$ is selected. Similarly, a LD selection signal "3" designates a period for which the third light source unit 2 (not illustrated) is selected, and a LD selection signal "4" designates a period for which the light source unit $2_n$ is selected. In this example, it is set such that, in a period of time between the time $t_{11}$ and $t_{12}$ in a single slot, the LD selection signals "1", "2", "3", and "4" are sequentially designated and the light source units $2_1$, $2_2$, . . . , and $2_n$ are sequentially selected.

A light emission trigger is issued several times (for example several tens of times to several thousands of times) in a period of time indicated by each of the LD selection signals "1", "2", "3", and "4". Namely, within a period of time between the time $t_{11}$ and the time $t_{12}$, in a single target slot designated by the LD selection signal "1", a light emission trigger is issued several times to the light source unit $2_1$ selected by the LD selection signal "1", the light source unit $2_1$ emits light several times in accordance with the plurality of issues of the light emission triggers. Subsequently, a light emission trigger is sequentially issued several times in a period of time designated by the LD selection signals "2", "3", and "4", and each of the light source units $2_1$, $2_2$, . . . , and $2_n$ emits light in accordance with the respective light emission triggers. The FB signal is sequentially output from each of the light source units $2_1$, $2_2$, . . . , and $2_n$ in accordance with the respective light emission triggers and is supplied to the light emission control unit 105b.

The delay measurement unit 1051' obtains, regarding the target slot, the amount of delay $FB_{dly}$ for each of the FB signals supplied from the respective light source units $2_1$, $2_2$, . . . , and $2_n$. The representative value calculating unit 1052 calculates an average value of the obtained amounts of delay $FB_{dly}$.

At this time, the representative value calculating unit 1052 individually calculates an average value of the amounts of delay $FB_{dly}$ regarding each of the FB signals supplied from the respective light source units $2_1$, $2_2$, . . . , and $2_n$. This is preferably applied to a case of generating a histogram of each of the areas LD #1, LD #2, LD #3, and LD #4 by, for example, the ranging processing unit 101.

The example is not limited to this and the representative value calculating unit 1052 is able to collectively calculate an average value of the amounts of delay $FB_{dly}$ of each of the amount of delays $FB_{dly}$ that are obtained for each of the FB signals supplied from the respective light source units $2_1$, $2_2$, . . . , and $2_n$. This is preferably applied to a case of collectively generating a histogram of the areas LD #1, LD #2, LD #3, and LD #4 by, for example, the ranging processing unit 101.

Furthermore, in the above description, each of the LD selection signals "1", "2", "3", and "4" is designated to a single slot; however, the example is not limited to this. For example, the LD selection signals "1", "2", "3", and "4" may also be repeatedly designated in a single slot. Furthermore, it may also be possible to designate the LD selection signals "1", "2", "3", and "4" for each slot, such as designating the LD selection signal "1" to a certain slot, designating the LD selection signal "2" to the next slot, and . . . .

Third Embodiment

In the following, a third embodiment according to the present disclosure will be described. The third embodiment is an example in which an error of the representative value in a slot is detected on the basis of a representative value of a frame calculated by the representative value calculating unit 1052, a representative value of a slot, and a predetermined threshold.

Figure 24:
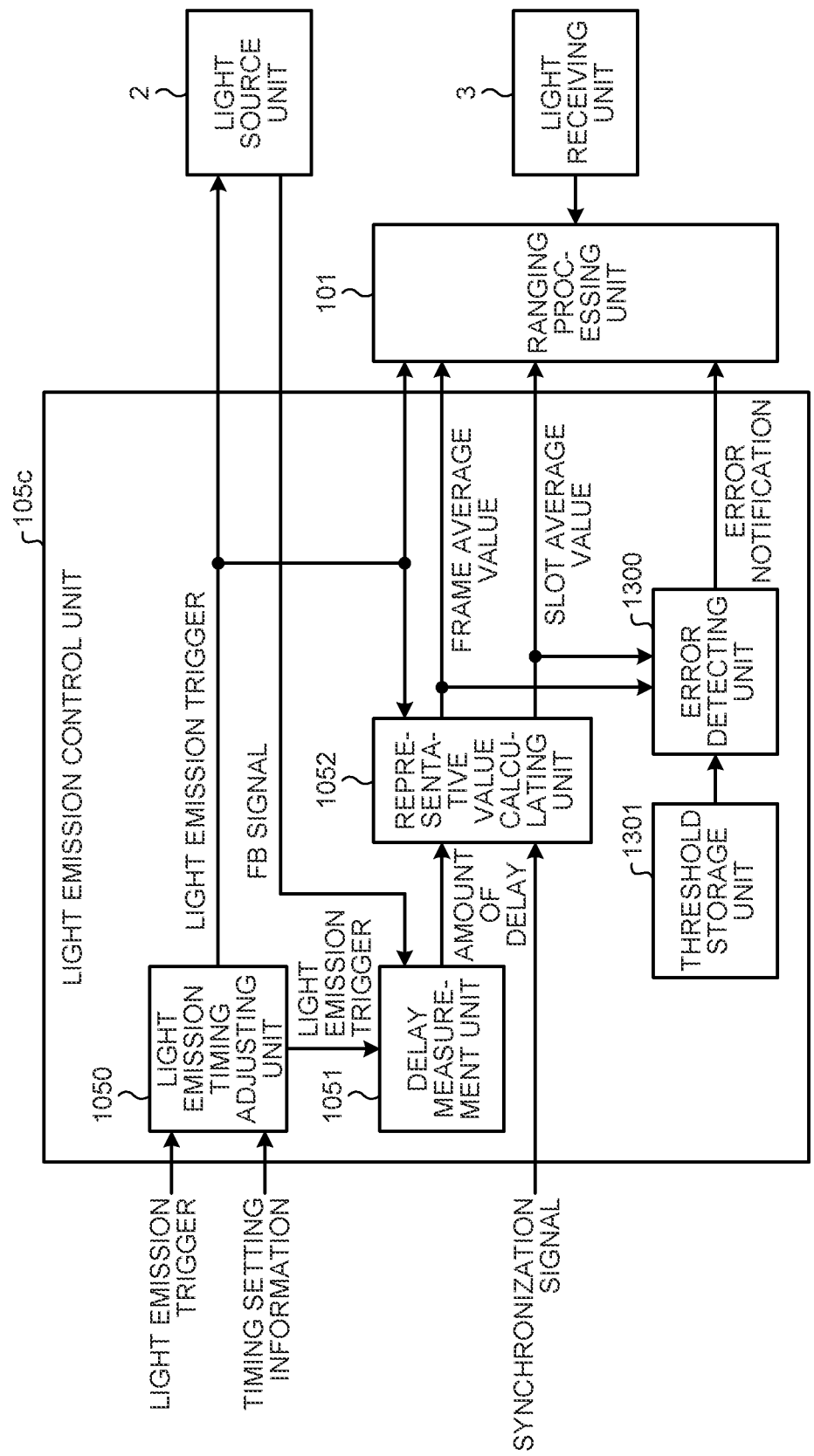
FIG. 24 is a block diagram illustrating a configuration of an example of a light emission control unit according to a third embodiment.

FIG. 24 is a block diagram illustrating an example of a configuration of the light emission control unit according to the third embodiment. In FIG. 24, in a light emission control unit 105c, an error detecting unit 1300 and a threshold storage unit 1301 are added to the light emission control unit 105a according to the first embodiment described with reference to FIG. 9.

In FIG. 24, the frame average value and the slot average value that are output from the representative value calculating unit 1052 are supplied to the error detecting unit 1300. The error detecting unit 1300 calculates a difference between the frame average value and the slot average value that are supplied from the representative value calculating unit 1052 and determines, if the difference exceeds a threshold range that is stored in the threshold storage unit 1301 in advance, the slot average value is an error. The error detecting unit 1300 notifies the ranging processing unit 101 of the information that indicates the slot determined to be an error as an error notification.

Figure 25:
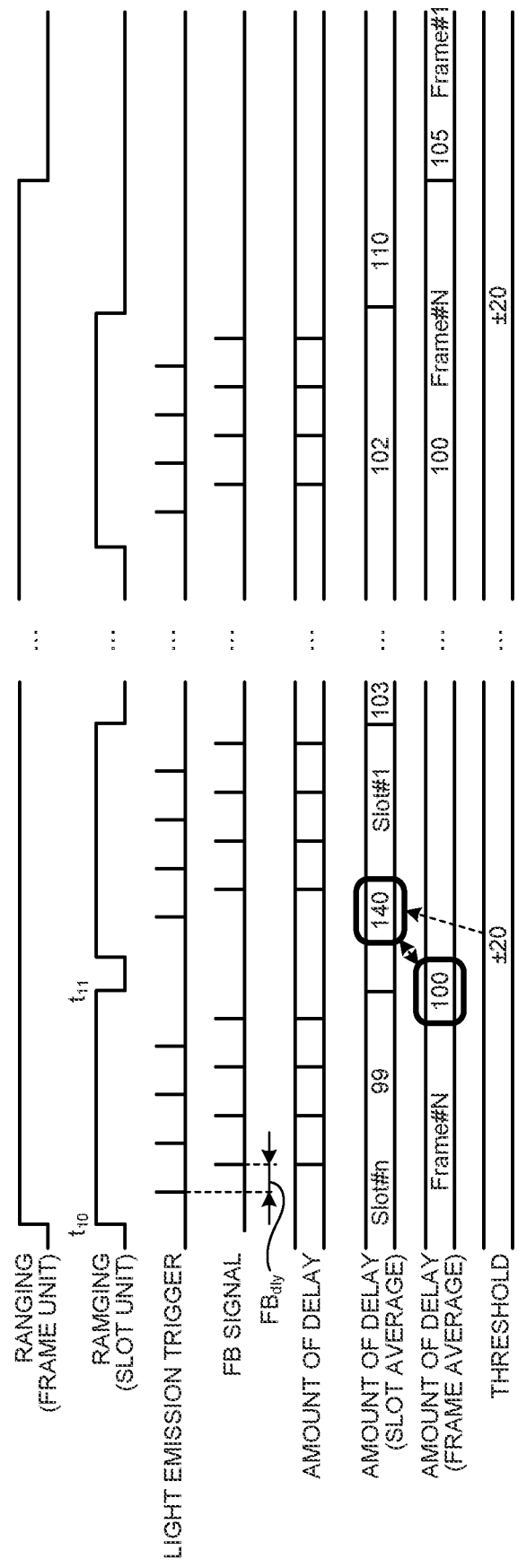
FIG. 25 is a sequence chart illustrating an example of an operation of the light emission control unit according to the third embodiment.

FIG. 25 is an example of a sequence chart illustrating an operation of the light emission control unit 105c according to the third embodiment. FIG. 25 illustrates, from the upper part, a ranging period in units of frames Frame, a ranging period in units of slots Slot, a LD selection signal, a FB signal, an amount of delay, an amount of delay in units of slots Slot, an amount of delay in units of frame Frame, and a threshold. Among of these, the amount of delay is the amount of delay $FB_{dly}$ itself measured by the delay measurement unit 1051. Furthermore, in the example illustrated in FIG. 25, it is assumed that the threshold is a fixed value (in this example, [±20]) over an entire period.

The error detecting unit 1300 acquires the frame average value and the slot average value at the timing at which, for example, the slot average value is updated, and then calculates a difference between the acquired frame average value and the slot average value. At this time, the frame average value corresponds to the average value in the frame that is immediately before the frame that includes the slot in which the subject slot average value is acquired.

The error detecting unit 1300 compares the obtained difference to the threshold that is stored in the threshold storage unit 1301 and determines, if the difference exceeds the threshold range, that the slot average value is an error. In the example illustrated in FIG. 25, the error detecting unit 1300 acquires a value of "100" as the frame average value of a frame Frame #N. Furthermore, if the slot moves from a slot Slot #n to the slot Slot #1 and the slot average value is updated, the error detecting unit 1300 acquires the updated slot average value. In this example, a value of "140" is acquired as the updated slot average value.

The error detecting unit 1300 obtains a difference between the frame average value "100" in, for example, the frame Frame #N and the updated slot average value "140". The error detecting unit 1300 obtains a difference of "40" by subtracting the frame average value "100" of the frame Frame #N from, for example, the updated slot average value "140", and compares the obtained difference of "40" to the threshold "±20" that is stored in the threshold storage unit 1301. Because the difference "40" exceeds the threshold range of "±20", the error detecting unit 1300 determines that the slot average value of the slot Slot #1 is an error.

The error detecting unit 1300 notifies the ranging processing unit 101 of the error notification by including the information that indicates the slot Slot #1 in which an error has been detected and information that indicates that the slot average value of the slot Slot #1 is an error. The ranging processing unit 101 does not use, in response to the error notification, the slot average value of, for example, the slot Slot #1 to correct the histogram. In this case, it is conceivable that the ranging processing unit 101 corrects the histogram by using a frame average value or a slot average value of the slot #n that is immediately before the slot Slot #1.

In this way, in the third embodiment, the representative value of the target slot is compared to the representative value of the frame and, if a difference is greater than or equal to a predetermined value, the representative value of the target slot is excluded. Accordingly, even if the representative value of the target slot is an abnormal value due to some sort of factor, it is possible to prevent, in the ranging processing unit 101, the abnormal value from being affected.

Fourth Embodiment

Figure 26:
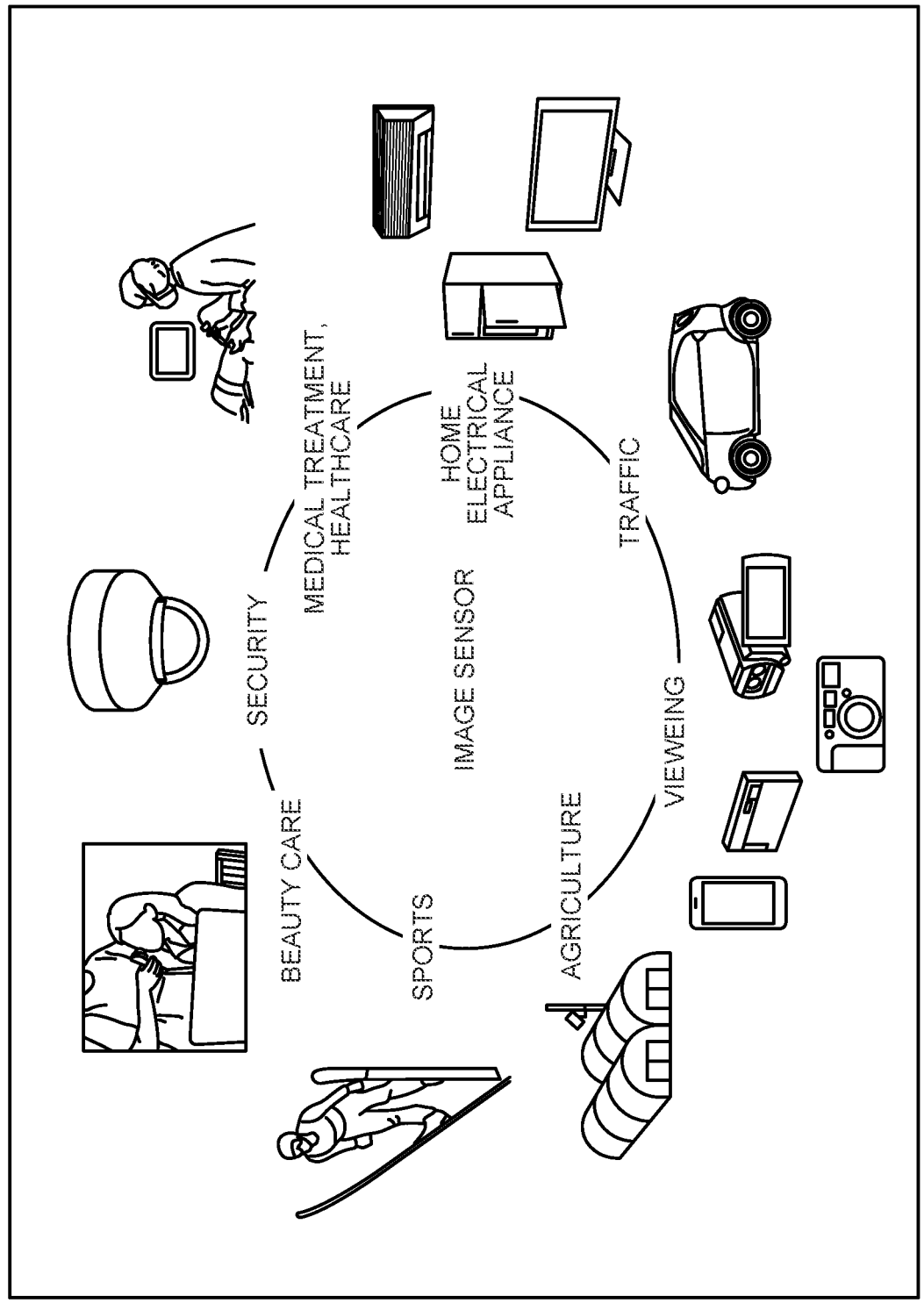
FIG. 26 is a diagram illustrating a use example of a ranging apparatus, which is applicable to the first embodiment, the modification of the first embodiment, the second embodiment, and the third embodiment, according to a fourth embodiment.

In the following, as a fourth embodiment according to the present disclosure, an example of application of the first embodiment, the modification of the first embodiment, the second embodiment, and the third embodiment according to the present disclosure will be described. FIG. 26 is a diagram illustrating a use example of the ranging apparatus 1, which is applicable to the first embodiment, the modification the first embodiment, the second embodiment, and the third embodiment described above, according to a fourth embodiment.

The ranging apparatus 1 described above is applicable to various cases in which, for example, light, such as visible light, infrared light, ultraviolet light, and X-ray, is sensed as described below.

Devices, such as a digital camera and a mobile phone with a camera function, which capture images to be provided for viewing.

Devices, such as an on-vehicle sensor that captures images of front, back, surroundings, and inside of a vehicle, a monitoring camera that monitors running vehicles and roads, and a ranging sensor that performs ranging a distance between vehicles, which are used for traffic to ensure safety driving, such as automatic stop, or to recognize a state of a driver.

Devices that are used for home electrical appliance, such as TV, a refrigerator, and an air conditioner, for capturing an image of a gesture of a user and operating devices in accordance with the gesture.

Devices, such as an endoscope and a device that captures an image of blood vessels by receiving infrared light, which are used for medical treatment and healthcare.

Devices, such as an anti-crime monitoring camera and a camera for person authentication, which are used for security.

Devices, such as a skin measurement apparatus that captures an image of skin and a microscope that captures an image of scalp, which are used for beauty care.

Devices, such as an action camera for sports and a wearable camera, which are used for sports.

Devices, such as a camera for monitoring a state of fields and crops, which are used for agriculture.

Additional Application Example of Technique According to Present Disclosure

Example of Application to Movable Body

The technique according to the present disclosure may further be applied to a device that is mounted on various movable bodies, such as a vehicle, an electric vehicle, a hybrid electric vehicle, an automatic two-wheel vehicle, a bicycle, a personal mobility, an airplane, a drone, boats and ships, and a robot.

Figure 27:
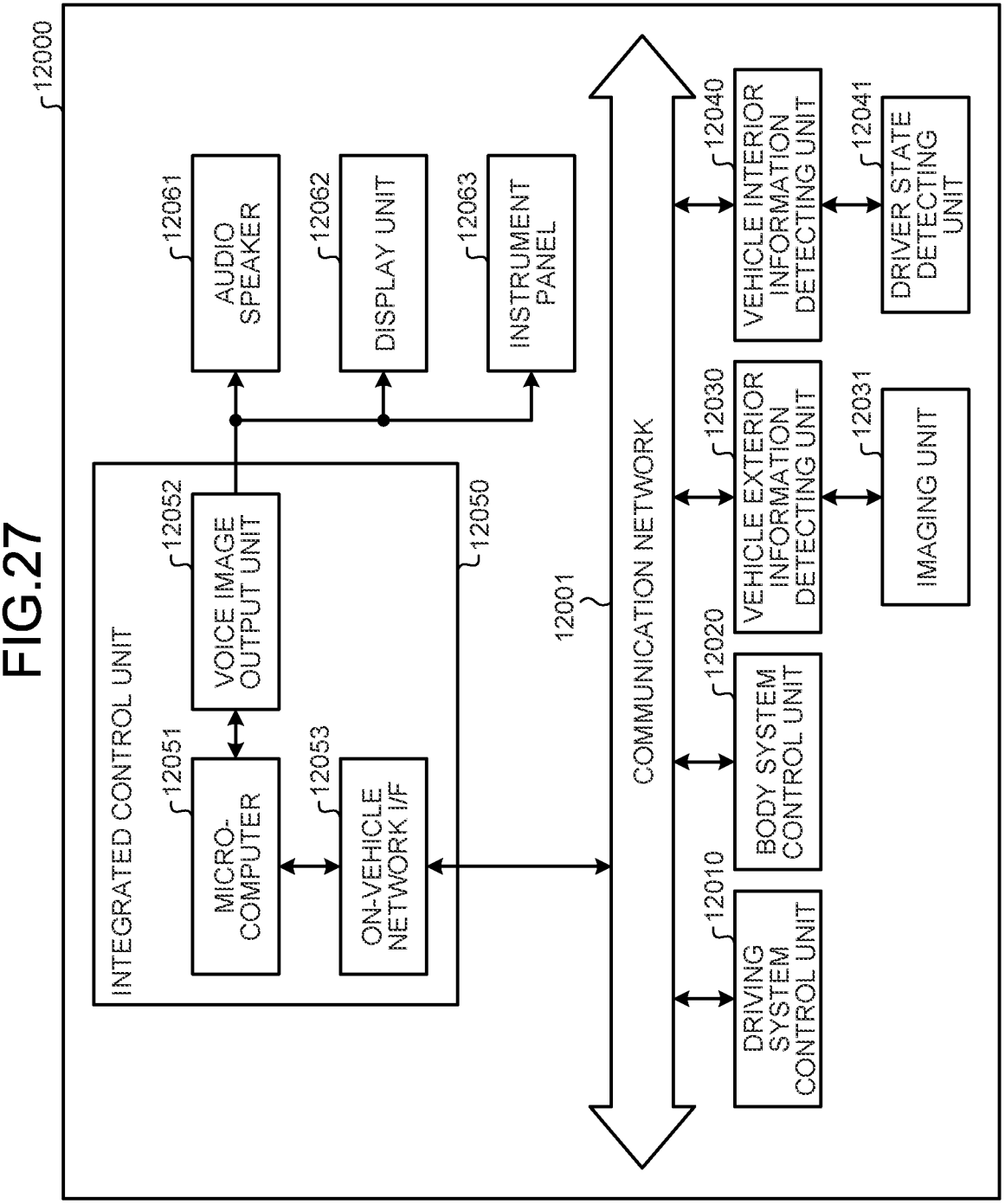
FIG. 27 is a block diagram illustrating a schematic configuration example of a vehicle control system that is an example of a movable body control system to which the technique according to the present disclosure is applicable.

FIG. 27 is a block diagram illustrating a schematic configuration example of a vehicle control system that is an example of a movable body control system to which the technique according to the present disclosure is applicable. A vehicle control system 12000 includes a plurality of electronic control units that are connected to each another via a communication network 12001. In the example illustrated in FIG. 27, the vehicle control system 12000 includes a driving system control unit 12010, a body system control unit 12020, a vehicle exterior information detecting unit 12030, a vehicle interior information detecting unit 12040, and an integrated control unit 12050. Furthermore, as a functional configuration of the integrated control unit 12050, a microcomputer 12051, a voice image output unit 12052, and an on-vehicle network interface (I/F) 12053 are illustrated.

The driving system control unit 12010 controls operation of devices related to a driving system of a vehicle in accordance with various programs. For example, the driving system control unit 12010 functions as a control device for a driving force generation device, such as an internal combustion engine or a driving motor, that generates a driving force of the vehicle, a driving force transmission mechanism for transmitting the driving force to wheels, a steering mechanism for adjusting a rudder angle of the vehicle, and a braking device that generates a braking force of the vehicle.

The body system control unit 12020 controls operation of various devices mounted on a vehicle body in accordance with various programs. For example, the body system control unit 12020 functions as a control device for a keyless entry system, a smart key system, a power window device, and various lamps, such as a head lamp, a back lamp, a brake lamp, a direction indicator, and a fog lamp. In this case, radio waves transmitted from a mobile terminal that is used as a substitute for a key or signals from various switches may be input to the body system control unit 12020. The body system control unit 12020 receives input of the radio waves or the signals, and controls a door lock device, a power window device, lamps, and the like of the vehicle.

A vehicle exterior information detecting unit 12030 detects information on the outside of the vehicle on which the vehicle control system 12000 is mounted. For example, an imaging unit 12031 is connected to the vehicle exterior information detecting unit 12030. The vehicle exterior information detecting unit 12030 allows the imaging unit 12031 to capture an image of the outside of the vehicle, and receives the captured image. The vehicle exterior information detecting unit 12030 may perform an object detection process or a distance detection process on a person, a vehicle, an obstacle, a sign, or characters on a road, on the basis of the received image. For example, the vehicle exterior information detecting unit 12030 performs image processing on the received image, and performs the object detection process or the distance detection process on the basis of a result of the image processing.

The imaging unit 12031 is an optical sensor that receives light and outputs an electrical signal corresponding to intensity of the received light. The imaging unit 12031 is also able to output the electrical signal as an image or information on a measured distance. Furthermore, the light that is received by the imaging unit 12031 may also be visible light or non-visible light, such as infrared light.

The vehicle interior information detecting unit 12040 detects information on the inside of the vehicle. For example, a driver state detecting unit 12041 that detects a state of a driver is connected to the vehicle interior information detecting unit 12040. The driver state detecting unit 12041 includes a camera that captures an image of the driver for example, and the vehicle interior information detecting unit 12040 may also calculate a degree of fatigue or a degree of concentration of the driver or may also determine whether the driver is sleeping on the basis of detection information that is input from the driver state detecting unit 12041.

The microcomputer 12051 is able to calculate a control target value of the driving force generation device, the steering mechanism, or the braking device on the basis of the information on the outside or the inside of the vehicle that is acquired by the vehicle exterior information detecting unit 12030 or the vehicle interior information detecting unit 12040, and issue a control command to the driving system control unit 12010. For example, the microcomputer 12051 is able to perform cooperation control to realize an advance driver assistance system (ADAS) function including vehicle crash avoidance, vehicle impact relaxation, following traveling on the basis of an inter-vehicular distance, vehicle crash warning, or vehicle lane deviation warning.

Furthermore, the microcomputer 12051 is able to perform cooperation control aiming at automatic driving in which a vehicle autonomously travels independent of operation of a driver for example, by controlling the driving force generation device, the steering mechanism, the braking device, or the like on the basis of information on the surroundings of the vehicle that is acquired by the vehicle exterior information detecting unit 12030 or the vehicle interior information detecting unit 12040.

Furthermore, the microcomputer 12051 is able to output a control command to the body system control unit 12020 on the basis of the information on the outside of the vehicle that is acquired by the vehicle exterior information detecting unit 12030. For example, the microcomputer 12051 is able to control the head lamp in accordance with a position of a preceding vehicle or an oncoming vehicle detected by the vehicle exterior information detecting unit 12030, and is able to perform cooperation control to implement anti-glare, such as switching from high beam to low beam.

The voice image output unit 12052 transmits an output signal of at least one of voice and an image to an output device capable of visually or aurally information to a passenger of the vehicle or to the outside of the vehicle. In the example in FIG. 27, an audio speaker 12061, a display unit 12062, and an instrument panel 12063 are illustrated as examples of the output device. The display unit 12062 may also include, for example, at least one of an on-board display and a head-up display.

Figure 28:
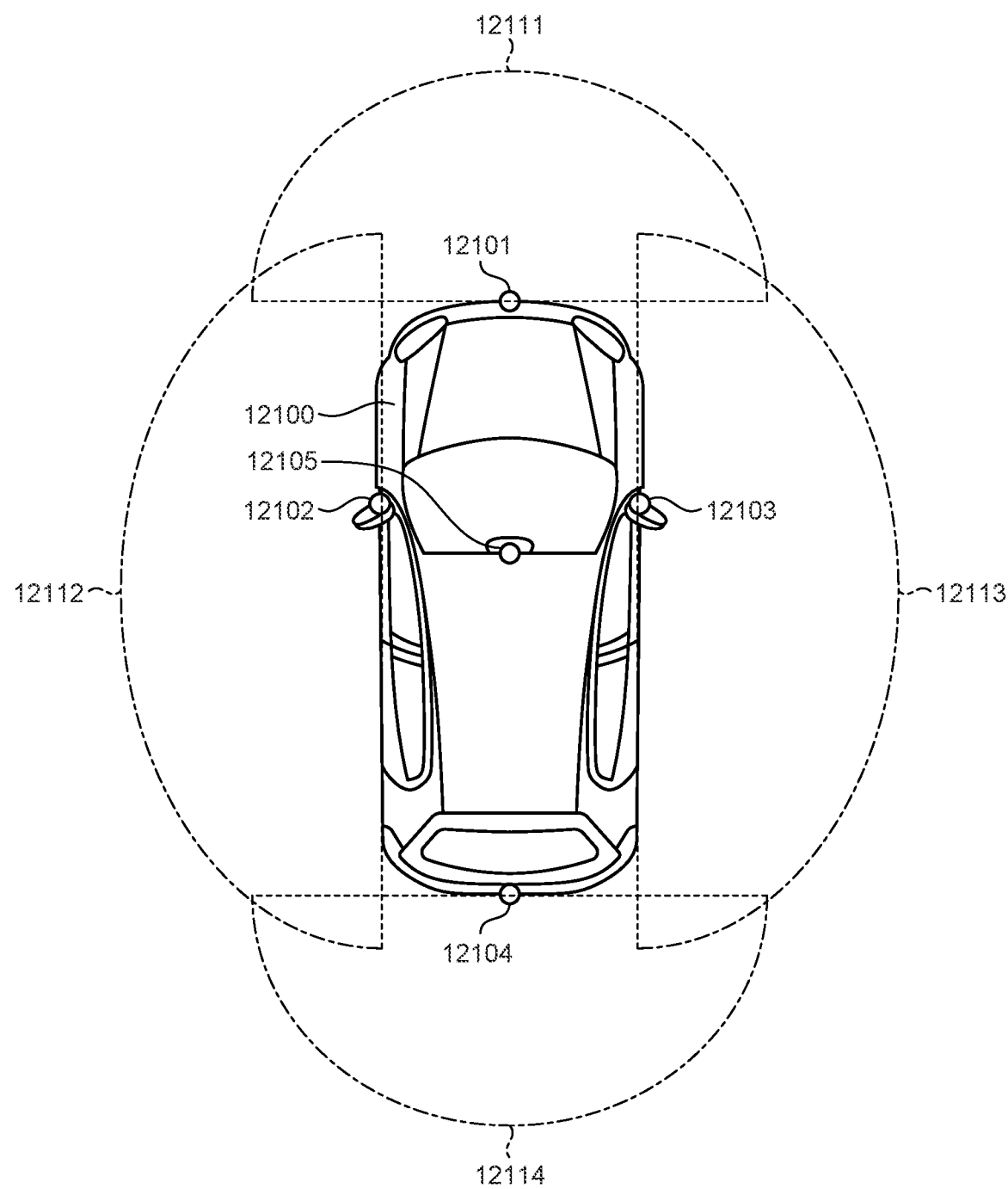
FIG. 28 is a diagram illustrating an example of installation positions of an imaging unit.

FIG. 28 is a diagram illustrating an example of installation positions of an imaging unit 12031. In FIG. 28, a vehicle 12100 includes, as the imaging unit 12031, imaging units 12101, 12102, 12103, 12104, and 12105.

The imaging units 12101, 12102, 12103, 12104, and 12105 are arranged at positions of, for example, a front nose, side mirrors, a rear bumper, a back door, or an upper part of a windshield inside the vehicle, and the like of the vehicle 12100. The imaging unit 12101 mounted on the front nose and the imaging unit 12105 mounted on the upper part of the windshield inside the vehicle mainly acquire images of the front of the vehicle 12100. The imaging units 12102 and 12103 mounted on the side mirrors mainly acquire images of the sides of the vehicle 12100. The imaging unit 12104 mounted on the rear bumper or the back door mainly acquires an image of the rear of the vehicle 12100. The front image acquired by the imaging units 12101 and 12105 is mainly used to detect a preceding vehicle, a pedestrian, an obstacle, a traffic signal, a traffic sign, a traffic lane, or the like.

Furthermore, FIG. 26 illustrates an example of imaging ranges of the imaging units 12101 to 12104. An imaging range 12111 indicates an imaging range of the imaging unit 12101 arranged on the front nose, imaging ranges 12112 and 12113 indicate imaging ranges of the imaging units 12102 and 12103 arranged on the respective side mirrors, and an imaging range 12114 indicates an imaging range of the imaging unit 12104 arranged on the rear bumper or the back door. For example, by superimposing pieces of image data captured by the imaging units 12101 to 12104, a downward image of the vehicle 12100 viewed from above is obtained.

At least one of the imaging units 12101 to 12104 may also have a function to acquire the distance information. For example, at least one of the imaging units 12101 to 12104 may be a stereo camera including a plurality of imaging elements, or may be an imaging element including a pixel for detecting a phase difference.

For example, by obtaining a distance to each of stereoscopic objects in the imaging ranges 12111 to 12114 and obtaining a temporal change in the distance (relative speed with respect to the vehicle 12100) on the basis of the distance information obtained from the imaging units 12101 to 12104, the microcomputer 12051 is able to particularly detect, as a preceding vehicle, a stereoscopic object that is located closest to the vehicle 12100 on a road on which the vehicle 12100 travels and that travels at a predetermined speed (for example, 0 km/h or higher) in approximately the same direction as the vehicle 12100. Furthermore, the microcomputer 12051 is able to set, in advance, an inter-vehicular distance that needs to be ensured on the near side of the preceding vehicle, and perform automatic braking control (including following stop control), automatic acceleration control (including following starting control), and the like. In this way, it is possible to perform cooperation control aiming at automatic driving or the like in which running is autonomously performed independent of operation of a driver.

For example, the microcomputer 12051 is able to classify and extract stereoscopic object data related to a stereoscopic object as a two-wheel vehicle, a normal vehicle, a heavy vehicle, a pedestrian, or other stereoscopic objects, such as a power pole, on the basis of the distance information obtained from the imaging units 12101 to 12104, and use the stereoscopic object data to automatically avoid an obstacle. For example, the microcomputer 12051 identifies an obstacle around the vehicle 12100 as an obstacle that can be viewed by the driver of the vehicle 12100 or an obstacle that can hardly be viewed by the driver. Then, the microcomputer 12051 determines a crash risk indicating a degree of risk of crash with each of objects, and if the crash risk is equal to or larger than a set value and there is the possibility that crash occurs, it is possible to support driving to avoid crash by outputting an alarm to the driver via the audio speaker 12061 or the display unit 12062 or performing forcible deceleration or avoidance steering via the driving system control unit 12010.

At least one of the imaging units 12101 to 12104 may also be an infrared camera that detects infrared light. For example, the microcomputer 12051 is able to recognize a pedestrian by determining whether a pedestrian is present in the captured images of the imaging units 12101 to 12104. The pedestrian recognition described above is performed by, for example, a process of extracting feature points in the captured images of the imaging units 12101 to 12104 that serve as the infrared cameras and a process of performing pattern matching on a series of feature points representing a contour of an object to determine whether the object is a pedestrian. If the microcomputer 12051 determines that a pedestrian is present in the captured images of the imaging units 12101 to 12104 and recognizes the pedestrian, the voice image output unit 12052 causes the display unit 12062 to display a rectangular contour line for enhancing the recognized pedestrian in a superimposed manner. Furthermore, the voice image output unit 12052 may also cause the display unit 12062 to display an icon or the like that represents the pedestrian at a desired position.

In the above, an example of the vehicle control system to which the technique according to the present disclosure is applicable has been described. The technique according to the present disclosure is applicable to, for example, the imaging unit 12031 in the configuration described above. Specifically, the ranging apparatus 1 applicable to the first embodiment, the modification of the first embodiment, the second embodiment, and the third embodiment described above is able to be used in the imaging unit 12031. By applying the technique according to the present disclosure to the imaging unit 12031, it is possible to perform ranging with higher accuracy.

Furthermore, the effects described in this specification are only exemplified and are not limited, and other effects may also be possible.

Furthermore, the present technology can also be configured as follows.

(1) A light receiving apparatus comprising:
    a light receiving unit that includes a light receiving element;
    a light emission control unit that issues a trigger for causing a light source to emit light;
    a receiving unit that receives, from a light source unit that includes the light source, a feedback signal that is output in accordance with a light emission timing at which the light source emits the light;
    a delay acquiring unit that acquires delay time of a reception timing, at which the feedback signal is received by the receiving unit, that is delayed relative to an issue timing at which the trigger is issued;
    a representative value acquiring unit that acquires a representative value of a plurality of pieces of the delay time acquired by the delay acquiring unit in accordance with the issue of the triggers issued by the light emission control unit a predetermined number of times; and
    a signal processing unit that performs signal processing on the basis of time information that indicates the light emission timing and a light receiving timing of the light receiving element, wherein the signal processing unit corrects the time information on the basis of the representative value.

(2) The light receiving apparatus according to the above (1), wherein the representative value acquiring unit acquires the representative value in which variations in the delay time that is acquired by the delay acquiring unit and that is caused by random noise that is included in the feedback signal are reduced.

(3) The light receiving apparatus according to the above (1) or (2), wherein the representative value acquiring unit calculates the representative value in which variations in the delay time that is acquired by the delay acquiring unit and that is caused by noise that is in accordance with a state of the light source unit and that is included in the feedback signal are reduced.

(4) The light receiving apparatus according to any one of the above (1) to (3), wherein the representative value acquiring unit calculates the representative value in which variations in the delay time that is acquired by the delay acquiring unit and that is caused by noise that is in accordance with a temperature of the light source unit and that is included in the feedback signal are reduced.

(5) The light receiving apparatus according to any one of the above (1) to (4), wherein the representative value acquiring unit acquires the representative value of the plurality of pieces of the delay time acquired by performing, multiple times, an operation of issuing the triggers the predetermined number of times.

(6) The light receiving apparatus according to any one of the above (1) to (4), wherein
the representative value acquiring unit acquires, as the representative value,
a first representative value that is acquired in accordance with the issue of the triggers issued the predetermined number of times, and
a second representative value that is acquired by performing, multiple times, an operation of issuing the triggers the predetermined number of times, and the light receiving apparatus further comprises
an error detecting unit that detects an error of the first representative value on the basis of a difference between the first representative value and the second representative value.

(7) The light receiving apparatus according to any one of the above (1) to (6), wherein
the light emission control unit issues, multiple times at a time, the triggers to a plurality of light sources as the light source included in the light source unit,
the delay acquiring unit acquires the pieces of the delay time of the respective reception timings, at which the feedback signals that are associated with the respective triggers output by the light emission control unit multiple times at a time and that are output from the plurality of respective light sources included in the light source unit are received by the receiving unit, that are delayed relative to the respective issue timings, at which the triggers are issued in association with the respective feedback signals, and
the representative value acquiring unit acquires the representative value of the plurality of pieces of the delay time acquired by the acquiring unit in accordance with an operation of issuing, multiple times at a time, the triggers performed by the light emission control unit the predetermined number of times.

(8) The light receiving apparatus according to any one of the above (1) to (7), wherein the representative value acquiring unit generates a delay time histogram on the basis of the plurality of pieces of the delay time acquired by the acquiring unit in accordance with an operation of issuing the triggers performed by the light emission control unit the predetermined number of times.

(9) The light receiving apparatus according to any one of the above (1) to (8), wherein
the receiving unit includes
a first receiving unit that receives the feedback signal having a first pulse width, and
a second receiving unit that receives a feedback signal having a second pulse width that is narrower than the first pulse width.

(10) The light receiving apparatus according to any one of the above (1) to (9), wherein the receiving unit receives the feedback signal in accordance with a plurality of clocks each having a difference phase.

(11) The light receiving apparatus according to any one of the above (1) to (10), further comprising:
a time measurement unit that acquires a measurement value by measuring a time period between the light emission timing and a light receiving timing at which the light receiving element receives the light; and
a generating unit that generates a histogram on the basis of the measurement value, wherein
the generating unit generates the histogram by using the measurement value that is corrected on the basis of the representative value acquired by the representative value acquiring unit.

(12) A ranging apparatus comprising:
a light receiving unit that includes a light receiving element;
a time measurement unit that acquires a measurement value by measuring a time period between a light emission timing at which a light source emits light and a light receiving timing at which the light receiving apparatus receives the light;
a light emission control unit that issues a trigger for causing the light source to emit the light;
a receiving unit that receives, from a light source unit that includes the light source, a feedback signal that is output in accordance with the light emission timing;
a delay acquiring unit that acquires delay time of a reception timing at which the feedback signal is received by the receiving unit is delayed relative to an issue timing at which the trigger is issued;
a representative value acquiring unit that acquires a representative value of a plurality of pieces of the delay time acquired by the delay acquiring unit in accordance with the issue of the triggers issued by the light emission control unit a predetermined number of times;
a generating unit that generates a histogram on the basis of the measurement value; and
an arithmetic unit that performs an operation of calculating a distance to an object to be measured on the basis of the histogram, wherein
the generating unit generates the histogram by using the measurement value that is corrected on the basis of the representative value acquired by the representative value acquiring unit.

(13) The ranging apparatus according to the above (12), wherein the representative value acquiring unit acquires the representative value in which variations in the delay time that is acquired by the delay acquiring unit and that is caused by random noise that is included in the feedback signal are reduced.

(14) The ranging apparatus according to the above (12) or (13), wherein the representative value acquiring unit calculates the representative value in which variations in the delay time that is acquired by the delay acquiring unit and that is caused by noise that is in accordance with a state of the light source unit and that is included in the feedback signal are reduced.

(15) The ranging apparatus according to any one of the above (12) to (14), wherein the representative value acquiring unit calculates the representative value in which variations in the delay time that is acquired by the delay acquiring unit and that is caused by noise that is in accordance with a temperature of the light source unit and that is included in the feedback signal are reduced.

(16) The ranging apparatus according to any one of the above (12) to (15), wherein the representative value acquiring unit acquires the representative value of the plurality of pieces of the delay time acquired by performing, multiple times, an operation of issuing the triggers the predetermined number of times.

(17) The ranging apparatus according to any one of the above (12) to (15), wherein
the representative value acquiring unit acquires, as the representative value,
a first representative value that is acquired in accordance with the issue of the triggers issued the predetermined number of times, and
a second representative value that is acquired by performing, multiple times, an operation of issuing the triggers the predetermined number of times, and the light receiving apparatus further comprises
an error detecting unit that detects an error of the first representative value on the basis of a difference between the first representative value and the second representative value.

(18) The ranging apparatus according to any one of the above (12) to (17), wherein
the light emission control unit issues, multiple times at a time, the triggers to a plurality of light sources as the light source included in the light source unit,
the delay acquiring unit acquires the pieces of the delay time of the respective reception timings, at which the feedback signals that are associated with the respective triggers output by the light emission control unit multiple times at a time and that are output from the plurality of respective light sources included in the light source unit are received by the receiving unit, that are delayed relative to the respective issue timings, at which the triggers are issued in association with the respective feedback signals, and
the representative value acquiring unit acquires the representative value of the plurality of pieces of the delay time acquired by the acquiring unit in accordance with an operation of issuing, multiple times at a time, the triggers performed by the light emission control unit the predetermined number of times.

(19) The ranging apparatus according to any one of the above (12) to (18), wherein the representative value acquiring unit generates a delay time histogram on the basis of the plurality of pieces of the delay time acquired by the acquiring unit in accordance with an operation of issuing the triggers performed by the light emission control unit the predetermined number of times.

(20) The ranging apparatus according to any one of the above (12) to (19), wherein
the receiving unit includes
a first receiving unit that receives the feedback signal having a first pulse width, and
a second receiving unit that receives a feedback signal having a second pulse width that is narrower than the first pulse width.

(21) The ranging apparatus according to any one of the above (12) to (20), wherein the receiving unit receives the feedback signal in accordance with a plurality of clocks each having a difference phase.

(22) A light emission control method comprising:
a light emission control step of issuing a trigger for causing a light source to emit light;
a receiving step of receiving, from a light source unit that includes the light source, a feedback signal that is output in accordance with a light emission timing at which the light source emits the light;
a delay acquiring step of acquiring delay time of a reception timing at which the feedback signal is received at the receiving step that is delayed relative to an issue timing at which the trigger is issued;
a representative value acquiring step of acquiring a representative value of a plurality of pieces of the delay time acquired at the delay acquiring step in accordance with the triggers issued a predetermined number of times at the light emission control step; and
a signal processing Step of performing signal processing on the basis of the light emission timing and a light receiving timing of the light receiving element included in the light receiving unit, wherein
the signal processing step includes correcting the light emission timing on the basis of the representative value.

REFERENCE SIGNS LIST 1 ranging apparatus
2, $2_1$, $2_2$, $2_n$ light source unit
10 pixel
100 pixel array unit
101 ranging processing unit
103 overall control unit
105, 105a, 105b, 105c, 1500 light emission control unit
200 LD
201 driver
1050, 1050' light emission timing adjusting unit
1051, 1051' delay measurement unit
1052 representative value calculating unit
1070 measurement period designating unit
1071 counter
1090 light emission trigger counting unit
1091 number-of-accumulations counting unit
1092 amount-of-delay accumulating unit
1093 slot average value calculating unit
1094 slot average value accumulating unit
1095 frame average value calculating unit
1150 FB signal receiving unit
1160 delay measurement counter unit
1300 error detecting unit
1301 threshold storage unit

The invention claimed is:
1. A light receiving apparatus, comprising:
a light emission control unit operatively coupled to one or more light sources of a light source unit, wherein
the light emission control unit is configured to transmit, at an issue timing, a light emission trigger input for at least one light source of the one or more light sources, and the at least one light source of the one or more light sources is configured to emit light at a light emission timing, based on the light emission trigger input;

a receiving unit configured to receive, from the light source unit, a feedback signal at a reception timing, wherein the light source unit outputs the feedback signal based on the light emission timing;

a delay acquiring unit configured to acquire delay time associated with the reception timing relative to the issue timing;

a representative value acquiring unit configured to acquire a representative value corresponding to the delay time;

a light receiving element configured to receive, at a light receiving timing, reflected light from an object; and a signal processing unit configured to:
adjust the light emission timing based on the representative value corresponding to the delay time;
generate a target signal based on the adjusted light emission timing and the light receiving timing; and
determine at least one attribute of the object based on the generated target signal.

2. The light receiving apparatus according to claim 1, wherein the representative value acquiring unit is further configured to:
obtain a plurality of instances of the delay time from the delay acquiring unit; and
acquire the representative value based on the plurality of instances of the delay time.

3. The light receiving apparatus according to claim 2, wherein variations between the plurality of instances of the delay time are caused by noise associated with a state of the light source unit.

4. The light receiving apparatus according to claim 2, wherein variations between the plurality of instances of the delay time are caused by noise associated with a temperature of the light source unit.

5. The light receiving apparatus according to claim 2, wherein
the light emission control unit is further configured to transmit a plurality of instances of the light emission trigger input, and
the representative value acquiring unit is further configured to obtain each instance of the delay time of the plurality of instances of the delay time corresponding to a respective instance of the light emission trigger input of the plurality of instances of the light emission trigger input.

6. The light receiving apparatus according to claim 1, wherein
the light emission control unit is further configured to transmit a plurality of instances of the light emission trigger input,
for the acquisition of the representative value, the representative value acquiring unit is further configured to:
obtain a first value based on a count of the plurality of instances of the light emission trigger input; and
obtain a second value based on the transmission of the plurality of instances of the light emission trigger input, and
the light receiving apparatus further comprises an error detecting unit configured to:
determine a difference between the first value and the second value; and
detect an error associated with the first value based on the difference between the first value and the second value.

7. The light receiving apparatus according to claim 1, wherein
the light source unit includes a plurality of light sources, the plurality of light sources including the one or more light sources,
the light emission control unit is configured to transmit a plurality of instances of the light emission trigger input,
each instance of the light emission trigger input of the plurality of instances of the light emission trigger input corresponds to a respective light source of the plurality of light sources,
the receiving unit is configured to receive a plurality of instances of the feedback signal at a plurality of instances of the reception timing,
each instance of the reception timing of the plurality of instances of the reception timing corresponds to a respective instance of the light emission trigger input of the plurality of instances of the light emission trigger input,
the delay acquiring unit is further configured to acquire a plurality of instances of the delay time,
each instance of the delay time of the plurality of instances of the delay time corresponds to a respective instance of the reception timing of the plurality of instances of the reception timing, and
the representative value acquiring unit is further configured to acquire a plurality of instances of the representative value,
each instance of the representative value of the plurality of instances of the representative value corresponds to a respective instance of the delay time of the plurality of instances of the delay time.

8. The light receiving apparatus according to claim 1, wherein the representative value acquiring unit is further configured to:
obtain a plurality of instances of the delay time from the delay acquiring unit; and
generate a delay time histogram based on the plurality of instances of the delay time.

9. The light receiving apparatus according to claim 1, wherein
the receiving unit is further configured to receive a plurality of instances of the feedback signal,
the receiving unit includes a first receiver unit and a second receiver unit,
the first receiver unit is configured to receive a first instance of the feedback signal of the plurality of instances of the feedback signal,
the second receiver unit is configured to receive a second instance of the feedback signal of the plurality of instances of the feedback signal, and
a second pulse width of the second instance of the feedback signal is narrower than a first pulse width of the first instance of the feedback signal.

10. The light receiving apparatus according to claim 1, wherein
the receiving unit is further configured to receive a plurality of instances of the feedback signal based on a plurality of clocks, and
each first clock of the plurality of clocks has a phase difference with respect to each second clock of the plurality of clocks.

11. The light receiving apparatus according to claim 1, further comprising:
a time measurement unit configured to acquire a measurement value based on a time period between the light emission timing and the light receiving timing; and
a generating unit configured to:
correct the measurement value based on the representative value corresponding to the delay time; and
generate a histogram based on the corrected measurement value.

12. A ranging apparatus, comprising:
a light emission control unit operatively coupled to one or more light sources of a light source unit, wherein
the light emission control unit is configured to transmit, at an issue timing, a light emission trigger input for at least one light source of the one or more light sources, and
the at least one light source of the one or more light sources is configured to emit light at a light emission timing based on the light emission trigger input;
a receiving unit configured to receive, from the light source unit, a feedback signal at a reception timing, wherein the light source unit outputs the feedback signal based on the light emission timing;
a delay acquiring unit configured to acquire delay time associated with the reception timing relative to the issue timing;
a representative value acquiring unit configured to acquire representative value corresponding to the delay time;
a light receiving element configured to receive, at a light receiving timing, reflected light from an object;
a time measurement unit configured to:
measure a time period between the light emission timing and the light receiving timing; and
acquire a measurement value based on the measured time period;
a generating unit configured to:
correct the measurement value based on the representative value corresponding to the delay time; and
generate a histogram based on the corrected measurement value; and
an arithmetic unit configured to calculate a distance to the object based on the histogram.

13. The ranging apparatus according to claim 12, wherein the representative value acquiring unit is further configured to
obtain a plurality of instances of the delay time from the delay acquiring unit; and
acquire the representative value based on the plurality of instances of the delay time.

14. The ranging apparatus according to claim 13, wherein variations between the plurality of instances of the delay time are caused by noise associated with a state of the light source unit.

15. The ranging apparatus according to claim 13, wherein variations between the plurality of instances of the delay time are caused by noise associated with a temperature of the light source unit.

16. The ranging apparatus according to claim 13, wherein the light emission control unit is further configured to transmit a plurality of instances of the light emission trigger input, and
the representative value acquiring unit is further configured to obtain each instance of the delay time of the plurality of instances of the delay time corresponding to a respective instance of the light emission trigger input of the plurality of instances of the light emission trigger input.

17. The ranging apparatus according to claim 12, wherein the light emission control unit is further configured to transmit a plurality of instances of the light emission trigger input,
for the acquisition of the representative value, the representative value acquiring unit is further configured to:
obtain a first value based on a count of the plurality of instances of the light emission trigger input; and
obtain a second value based on the transmission of the plurality of instances of the light emission trigger input, and
the ranging apparatus further comprises an error detecting unit configured to:
determine a difference between the first value and the second value; and
detect an error associated with the first value based on the difference between the first value and the second value.

18. The ranging apparatus according to claim 12, wherein the light source unit includes a plurality of light sources, the plurality of light sources including the one or more light sources,
the light emission control unit is configured to transmit a plurality of instances of the light emission trigger input,
each instance of the light emission trigger input of the plurality of instances of the light emission trigger input corresponds to a respective light source of the plurality of light sources,
the receiving unit is further configured to receive a plurality of instances of the feedback signal at a plurality of instances of the reception timing,
each instance of the reception timing of the plurality of instances of the reception timing corresponds to a respective instance of the light emission trigger input of the plurality of instances of the light emission trigger input,
the delay acquiring unit is configured to acquire a plurality of instances of the delay time,
each instance of the delay time of the plurality of instances of the delay time corresponds to a respective instance of the reception timing of the plurality of instances of the reception timing, and
the representative value acquiring unit is configured to acquire a plurality of instances of the representative value,
each instance of the representative value of the plurality of instances of the representative value corresponds to a respective instance of the delay time of the plurality of instances the delay time.

19. The ranging apparatus according to claim 12, wherein the representative value acquiring unit is further configured to:
obtain a plurality of instances of the delay time from the delay acquiring unit; and
generate a delay time histogram based on the plurality of instances of the delay time.

20. The ranging apparatus according to claim 12, wherein the receiving unit is further configured to receive a plurality of instances of the feedback signal,
the receiving unit includes a first receiver unit and a second receiver unit,
the first receiver unit is configured to receive a first instance of the feedback signal of the plurality of instances of the feedback signal, the second receiver unit is configured to receive a second instance of the feedback signal of the plurality of instances of the feedback signal, and a second pulse width of the second instance of the feedback signal is narrower than a first pulse width of the first instance of the feedback signal.

21. A light emission control method, comprising:

transmitting, at an issuing timing, a light emission trigger input for a light source of a light source unit, wherein the light source is configured to emit light at a light emission timing, based on the light emission trigger input;

receiving, from the light source unit, a feedback signal at a reception timing, wherein the light source unit is configured to output the feedback signal based on the light emission timing;

acquiring delay time associated with the reception timing relative to the issue timing;

acquiring a representative value corresponding to the delay time;

receiving, at a light receiving timing, reflected light from an object;

adjusting the light emission timing based on the representative value corresponding to the delay time;

generating a target signal based on the adjusted light emission timing and the light receiving timing; and determining at least one attribute of the object based on the target signal.

* * * * *